US012713496B2

(12) United States Patent
Jeon et al.

(10) Patent No.: US 12,713,496 B2
(45) Date of Patent: Aug. 18, 2026

(54) CONFIGURATION AND ACTIVATION OF CELL DISCONTINUOUS TRANSMISSION AND RECEPTION

(71) Applicant: Samsung Electronics Co., Ltd., Suwon-si (KR)

(72) Inventors: Jeongho Jeon, San Jose, CA (US); Aristides Papasakellariou, Houston, TX (US); Hongbo Si, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 18/416,723

(22) Filed: Jan. 18, 2024

(65) Prior Publication Data

US 2024/0267984 A1 Aug. 8, 2024

Related U.S. Application Data

(60) Provisional application No. 63/464,124, filed on May 4, 2023, provisional application No. 63/442,955, filed on Feb. 2, 2023.

(51) Int. Cl.
*H04W 76/28* (2018.01)

(52) U.S. Cl.
CPC .................................. *H04W 76/28* (2018.02)

(58) Field of Classification Search
CPC .................................................... H04W 76/28
See application file for complete search history.

(56) References Cited

U.S. PATENT DOCUMENTS

2014/0301343 A1* 10/2014 Park ...................... H04L 5/0055 370/329
2023/0007587 A1 1/2023 Ly et al.

OTHER PUBLICATIONS

Over OPPO, "Discussion on DTX/DRX mechanism", R1111953, 3GPP TSG-RAN WG2 #120, Toulouse, France, Nov. 4, 2022 (Year: 2022).*
CATT, Remaining issues on Cell DTX/DRX, R2-2211443, 3GPP TSG-RAN WG2#120, Toulouse, France, Nov. 4, 2022 (Year: 2022).*
"5G; NR; Physical channels and modulation (3GPP TS 38.211 version 17.4.0 Release 17)", ETSI TS 138 211 V17.4.0, Jan. 2023, 141 pages.
"5G; NR; Multiplexing and channel coding (3GPP TS 38.212 version 17.4.0 Release 17)", ETSI TS 138 212 V17.4.0, Jan. 2023, 206 pages.

(Continued)

*Primary Examiner* — Myron Wyche

(57) ABSTRACT

Methods and apparatuses for configuration and activation of cell discontinuous transmission (DTX) and cell discontinuous reception (DRX). A method performed by a user equipment (UE) includes receiving first information related to a set of parameters associated with cell DTX or DRX on a cell, second information related to an indication for activation or deactivation of the cell DTX or DRX, and the indication for activation or deactivation of the cell DTX or DRX. The indication is provided by a downlink control information (DCI) format or a radio resource control (RRC) message. The method further includes determining one of an active period and a non-active period of the cell DTX or DRX based on the indication for activation or deactivation of cell DTX or DRX, respectively, and receiving or transmitting channels or signals on the cell based on the determined active and non-active periods of the cell DTX or DRX, respectively.

17 Claims, 15 Drawing Sheets

(56) References Cited

OTHER PUBLICATIONS

"5G; NR; Physical layer procedures for control (3GPP TS 38.213 version 17.4.0 Release 17)", ETSI TS 138 213 V17.4.0, Jan. 2023, 263 pages.
"5G; NR; Physical layer procedures for data (3GPP TS 38.214 version 17.4.0 Release 17)", ETSI TS 138 214 V17.4.0, Jan. 2023, 236 pages.
"5G; NR; Medium Access Control (MAC) protocol specification (3GPP TS 38.321 version 17.3.0 Release 17)", ETSI TS 138 321 V17.3.0, Jan. 2023, 254 pages.
"5G; NR; Radio Resource Control (RRC); Protocol specification (3GPP TS 38.331 version 17.3.0 Release 17)", ETSI TS 138 331 V17.3.0, Jan. 2023, 1295 pages.
International Search Report issued May 2, 2024 regarding International Application No. PCT/KR2024/001605, 3 pages.
OPPO, "Discussion on DTX/DRX mechanism", 3GPP TSG-RAN WG2 #120, R2-2211953, Nov. 2022, 5 pages.
CATT, "Remaining issues on Cell DTX/DRX", 3GPP TSG-RAN WG2 #120, R2-2211443, Nov. 2022, 8 pages.
Intel Corporation, "Considerations of Cell DTX and DRX", 3GPP TSG-RAN WG2 Meeting #120, R2-2212113, Nov. 2022, 7 pages.
ZTE Corporation et al., "Supporting multiple DTX configuration", 3GPP TSG-RAN WG2 Meeting#120-e, R2-2212182, Nov. 2022, 4 pages.

* cited by examiner

400
Data In
CHANNEL CODING & MOD.
405
S-TO-P
410
SIZE N IFFT
415
P-TO-S
420
ADD CYCLIC PREFIX
425
UC
430
To Channel 450
From Channel
DC
455
REMOVE CYCLIC PREFIX
460
S-TO-P
465
SIZE N FFT
470
P-TO-S
475
CHANNEL DECOD. & DEMOD.
480
Data Out

1200

UE gNB

RRC configuration
(DTX/DRX parameters)

DCI/MAC-CE activation
(incl. updating DTX/DRX parameters)

Operation according to configured DTX/DRX parameters

DCI/MAC-CE deactivation

| $C_7$ | $C_6$ | $C_5$ | $C_4$ | $C_3$ | $C_2$ | $C_1$ | R | Oct 1 |
|---|---|---|---|---|---|---|---|---|

FIG. 16

| C4 | C3 | C2 | C1 | | Oct 1 |
|---|---|---|---|---|---|
| C7 | C6 | C5 | R | R | Oct 2 |

FIG. 17

CONFIGURATION AND ACTIVATION OF CELL DISCONTINUOUS TRANSMISSION AND RECEPTION

CROSS-REFERENCE TO RELATED APPLICATION AND CLAIM OF PRIORITY

This application claims priority under 35 U.S.C. § 119(e) to U.S. Provisional Patent Application No. 63/442,955 filed on Feb. 2, 2023, and to U.S. Provisional Patent Application No. 63/464,124 filed on May 4, 2023. The above-identified provisional patent applications is hereby incorporated by reference in its entirety.

TECHNICAL FIELD

The present disclosure relates generally to wireless communication systems and, more specifically, relates to methods and apparatuses for configuration and activation of cell discontinuous transmission (DTX) and cell discontinuous reception (DRX).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to configuration and activation of cell DTX and DRX.

In an embodiment, a method performed by a user equipment (UE) is provided. The method includes receiving first information related to a set of parameters associated with cell DTX or DRX on a cell, second information related to an indication for activation or deactivation of the cell DTX or the cell DRX, and the indication for activation or deactivation of the cell DTX or the cell DRX. The indication is provided by a downlink control information (DCI) format in a physical downlink control channel (PDCCH) reception, wherein the DCI format includes one or more information blocks and wherein the PDCCH reception is according to a common search space, or a radio resource control (RRC) message in a physical downlink shared channel (PDSCH) reception. The method further includes determining one of an active period and a non-active period of the cell DTX based on the indication for activation or deactivation of cell DTX or an active period and a non-active period of the cell DRX based on the indication for activation or deactivation of cell DRX. The method further includes one of receiving channels or signals on the cell based on the determined active and non-active periods of the cell DTX or transmitting channels or signals on the cell based on the determined active and non-active periods of the cell DRX.

In another embodiment, a base station (BS) is provided. The BS includes a transceiver configured to transmit first information related to a set of parameters associated with DTX or DRX on a cell, second information related to an indication for activation or deactivation of the cell DTX or the cell DRX, and the indication for activation or deactivation of the cell DTX or the cell DRX. The indication is provided by a DCI format in a PDCCH transmission, wherein the DCI format includes one or more information blocks and wherein the PDCCH transmission is according to a common search space, or a RRC message in a PDSCH transmission. The BS further includes a processor operably coupled to the transceiver, the processor configured to determine one of an active period and a non-active period of the cell DTX based on the indication for activation or deactivation of cell DTX or an active period and a non-active period of the cell DRX based on the indication for activation or deactivation of cell DRX. The transceiver is further configured to one of transmit channels or signals on the cell based on the determined active and non-active periods of the cell DTX or receive channels or signals on the cell based on the determined active and non-active periods of the cell DRX.

In yet another embodiment, a UE is provided. The UE includes a transceiver configured to receive first information related to a set of parameters associated with cell DTX or cell DRX on a cell, second information related to an indication for activation or deactivation of the cell DTX or the cell DRX, and the indication for activation or deactivation of the cell DTX or the cell DRX. The indication is provided by a DCI format in a PDCCH reception, wherein the DCI format includes one or more information blocks and wherein the PDCCH reception is according to a common search space, or a RRC message in a PDSCH reception. The UE further includes a processor operably coupled to the transceiver, the processor configured to determine one of an active period and a non-active period of the cell DTX based on the indication for activation or deactivation of cell DTX or an active period and a non-active period of the cell DRX based on the indication for activation or deactivation of cell DRX. The transceiver is further configured to one of receive channels or signals on the cell based on the determined active and non-active periods of the cell DTX or transmit channels or signals on the cell based on the determined active and non-active periods of the cell DRX.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates a diagram of an example MAC-CE for Type 2 cell DTX/DRX according to embodiments of the present disclosure; and FIG. 17 illustrates a diagram of another example MAC-CE for Type 2 cell DTX/DRX according to embodiments of the present disclosure.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.4.0, "NR; Physical channels and modulation" (REF1); 3GPP TS 38.212 v17.4.0, "NR; Multiplexing and Channel coding" (REF2); 3GPP TS 38.213 v17.4.0, "NR; Physical Layer Procedures for Control" (REF3); 3GPP TS 38.214 v17.4.0, "NR; Physical Layer Procedures for Data" (REF4); 3GPP TS 38.331 v17.3.0, "NR; Radio Resource Control (RRC) Protocol Specification" (REF5); and 3GPP TS 38.321 v17.3.0, "NR; Medium Access Control (MAC) protocol specification" (REF6).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
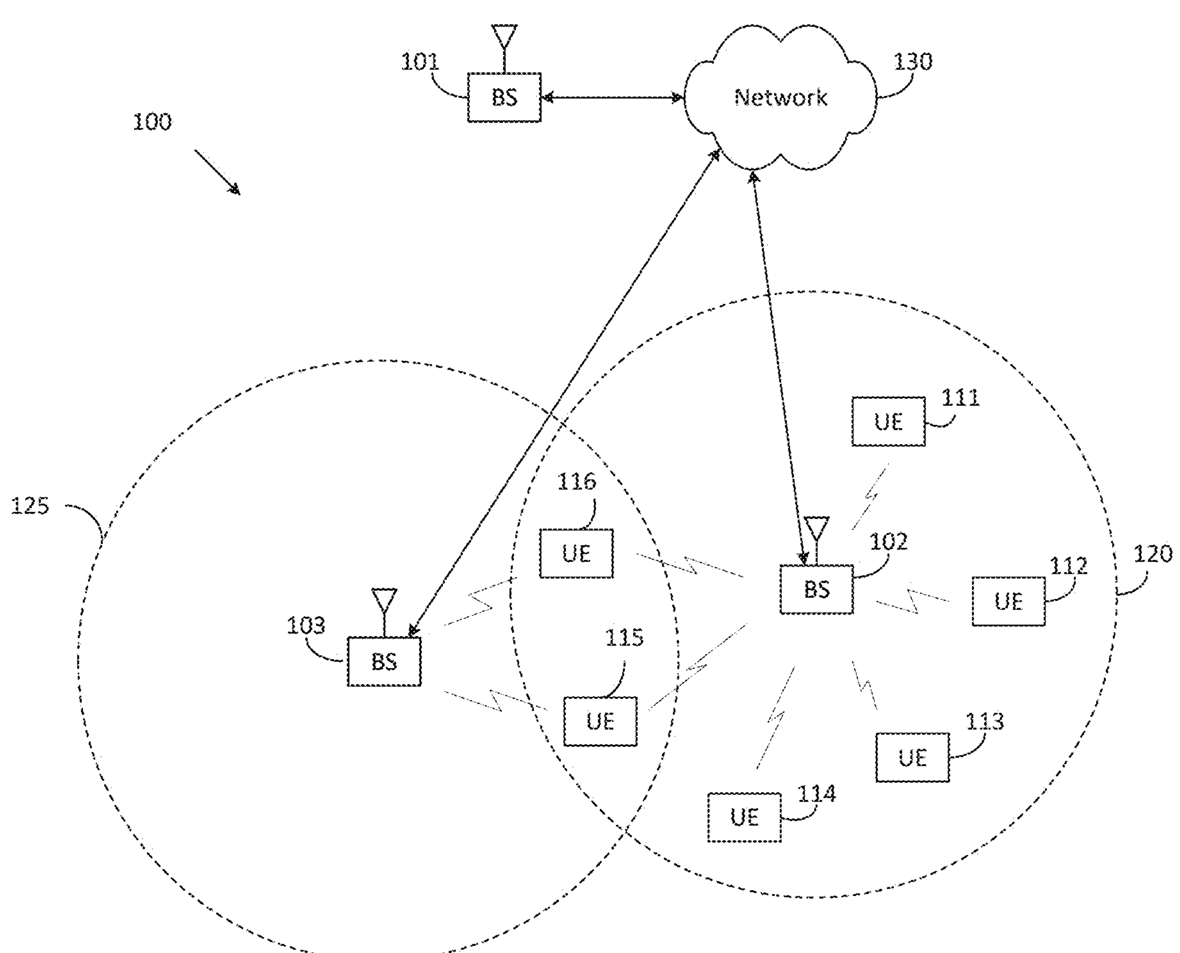
FIG. 1 illustrates an example wireless network according to embodiments of the present disclosure.
Figure 2:
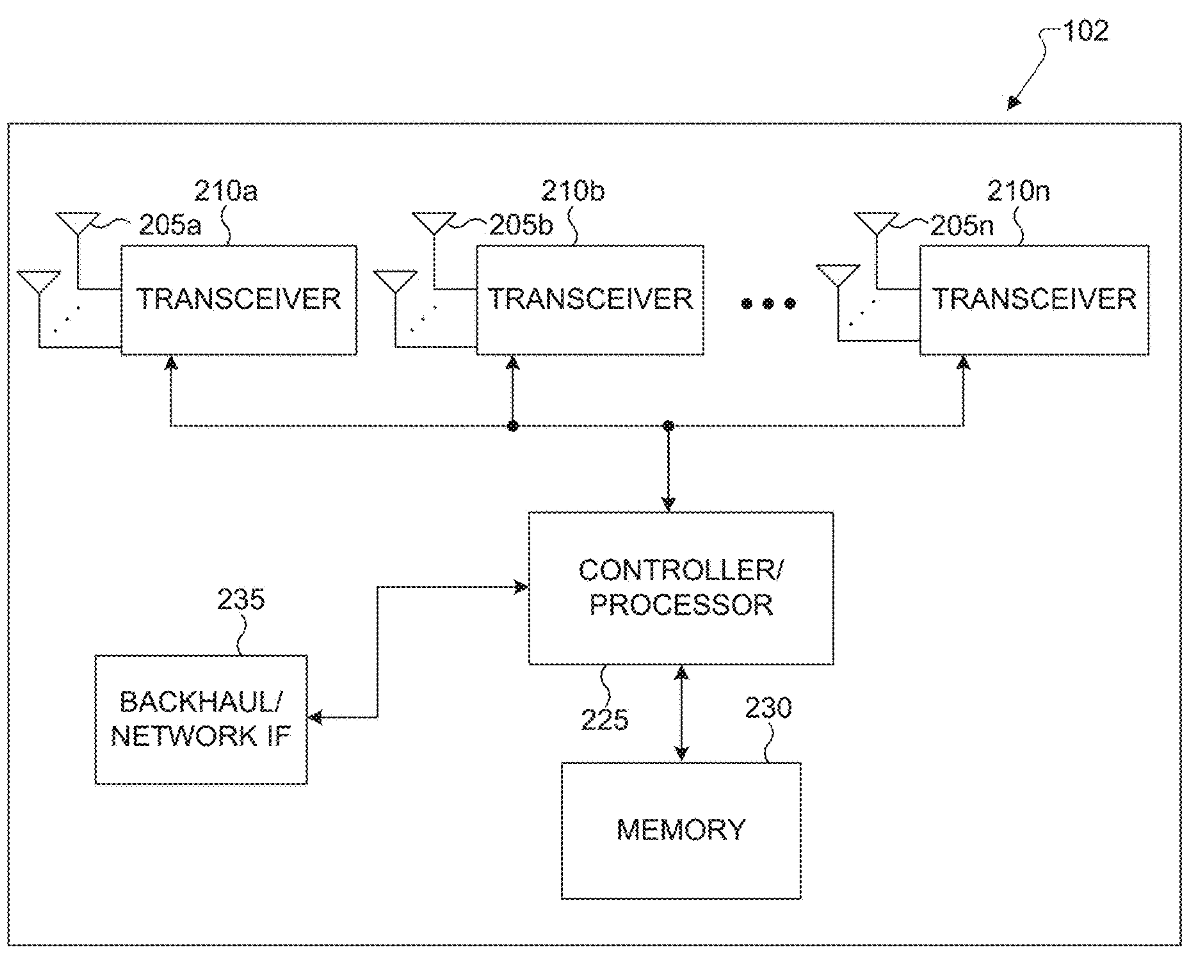
FIG. 2 illustrates an example base station according to embodiments of the present disclosure.
Figure 3:
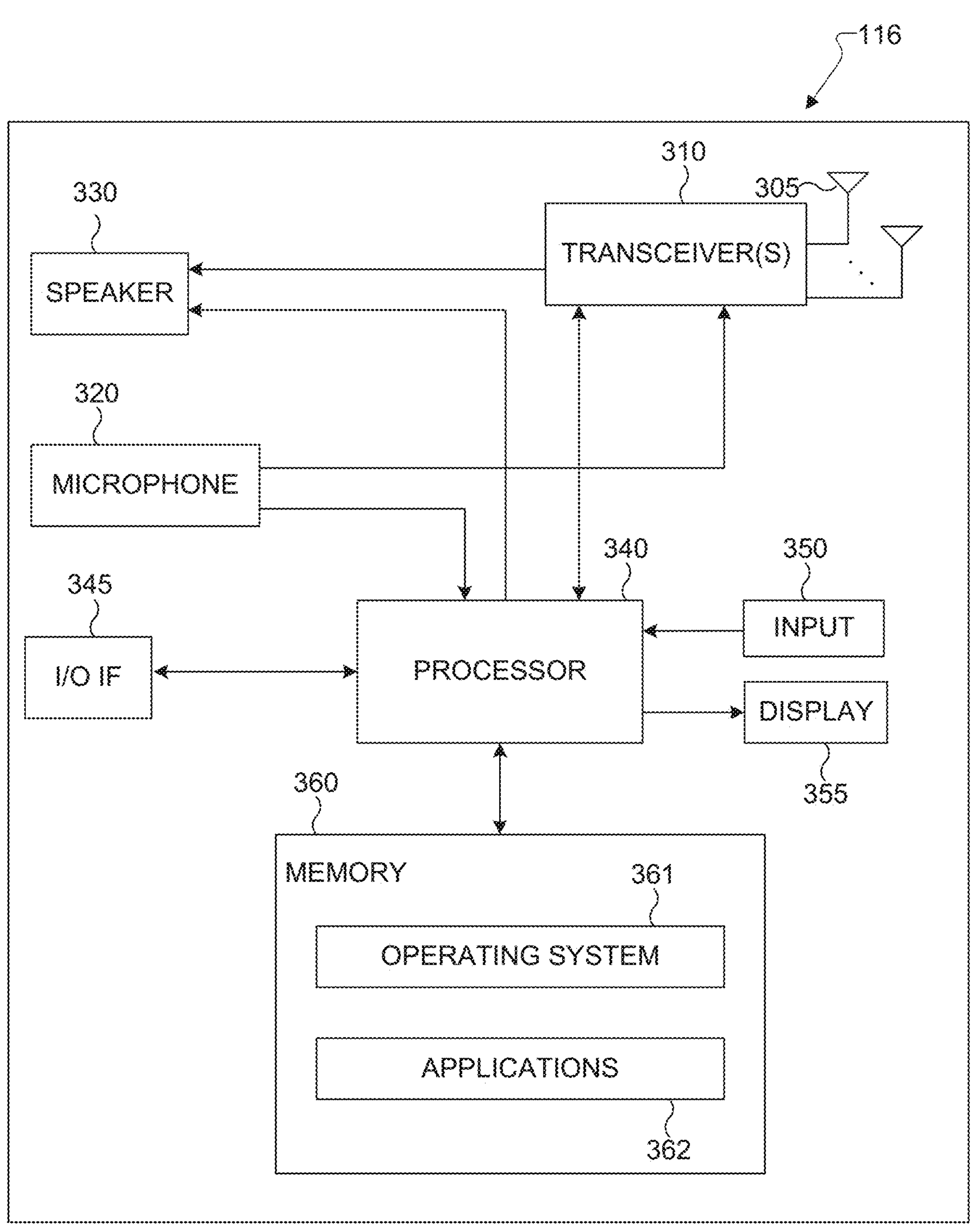
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3*rd* generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for configuration and activation of cell DTX and DRX. In certain embodiments, one or more of the BSs 101-103 include circuitry, programing, or a combination thereof to support configuration and activation of cell DTX and DRX.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235. The gNB 102, via the controller/processor 225**, may support configuration and activation of cell DTX and DRX in accordance with various embodiments of this disclosure.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210***a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support configuration and activation of cell DTX and DRX as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362. In embodiments of this disclosure, the UE 116 may support methods for configuration and activation of cell DTX and DRX via the antenna(s) 305, transceiver(s) 310, and the processor 340.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, as discussed in greater detail below, the processor 340 may execute processes to support configuration and activation of cell DTX and DRX. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4A, 4B:
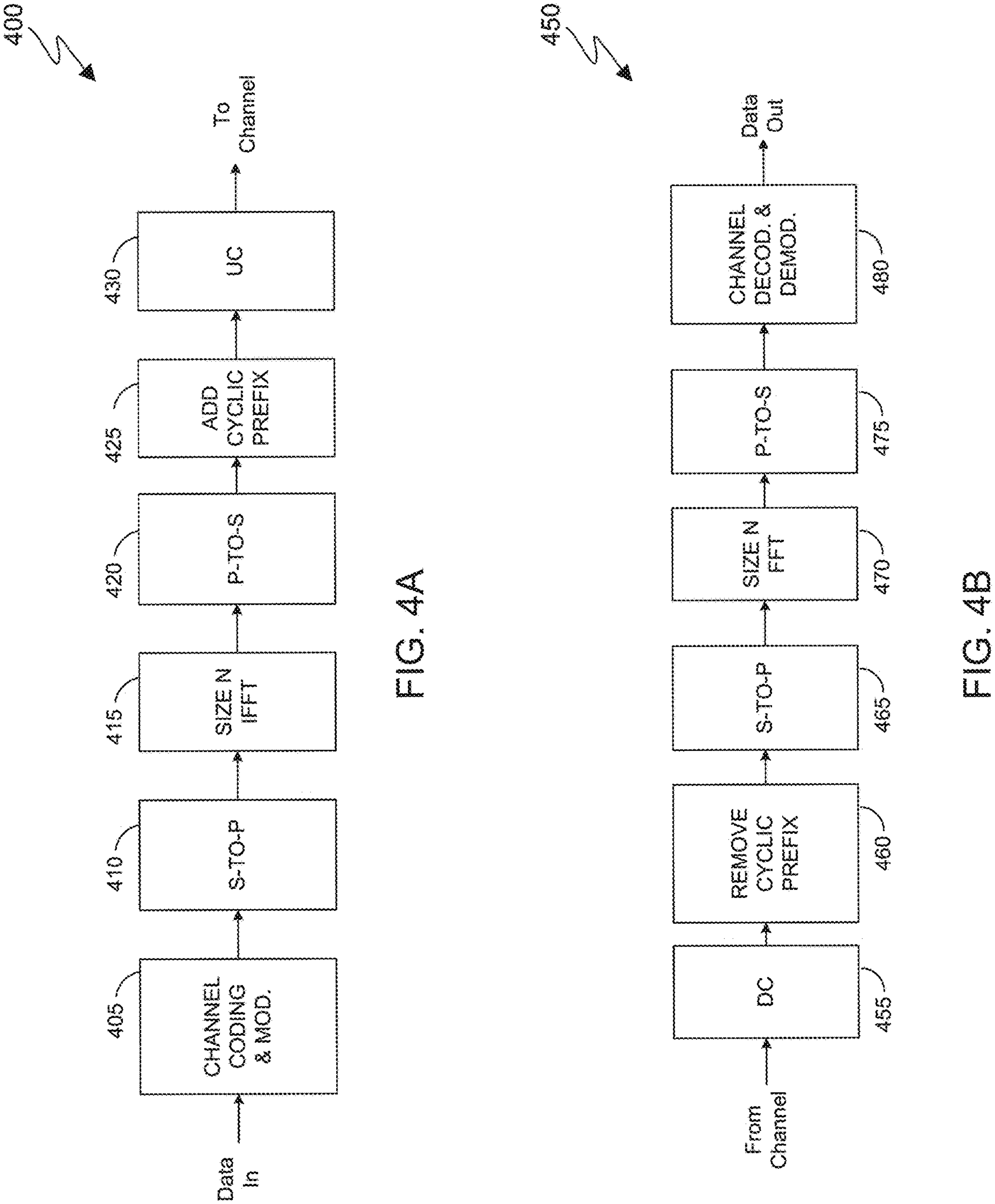
FIGS. 4A-B illustrate example wireless transmit and receive paths according to embodiments of the present disclosure.

FIGS. 4A and 4B illustrate example wireless transmit and receive paths according to this disclosure. In the following description, a transmit path 400 may be described as being implemented in an gNB (such as gNB 104), while a receive path 450 may be described as being implemented in a UE (such as UE 116). However, it will be understood that the receive path 450 can be implemented in an gNB and that the transmit path 400 can be implemented in a UE.

The transmit path 400 includes a channel coding and modulation block 405, a serial-to-parallel (S-to-P) block 410, a size N Inverse Fast Fourier Transform (IFFT) block 415, a parallel-to-serial (P-to-S) block 440, an add cyclic prefix block 445, and an up-converter (UC) 430. The receive path 450 includes a down-converter (DC) 455, a remove cyclic prefix block 460, a serial-to-parallel (S-to-P) block 465, a size N Fast Fourier Transform (FFT) block 470, a parallel-to-serial (P-to-S) block 475, and a channel decoding and demodulation block 480. In embodiments of this disclosure, the transmit path 400 and the receive path 450 are each configured to support methods and an apparatus for configuration and activation of cell DTX and DRX.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 104 and the UE 116. The size N IFFT block 415 performs an IFFT operation on the N parallel symbol streams to generate time-domain output signals. The parallel-to-serial block 440 converts (such as multiplexes) the parallel time-domain output symbols from the size N IFFT block 415 in order to generate a serial time-domain signal. The add cyclic prefix block 445 inserts a cyclic prefix to the time-domain signal. The up-converter 430 modulates (such as up-converts) the output of the add cyclic prefix block 445 to an RF frequency for transmission via a wireless channel. The signal may also be filtered at baseband before conversion to the RF frequency.

A transmitted RF signal from the gNB 104 arrives at the UE 116 after passing through the wireless channel, and reverse operations to those at the gNB 104 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103. In embodiments, the transmit path 400 and the receive path 450 are each configured to support CSI and radio link monitoring with reference signal adaptation.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 4, 3, 4, or the like) for DFT and IDFT functions, while the value of the variable N may be any integer number that is a power of two (such as 1, 4, 4, 8, 16, or the like) for FFT and IFFT functions.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In the following, an italicized name for a parameter implies that the parameter is provided by higher layers.

DL transmissions or UL transmissions can be based on an OFDM waveform including a variant using DFT precoding that is known as DFT-spread-OFDM that is typically applicable to UL transmissions.

In the following, subframe (SF) refers to a transmission time unit for the long term evolution (LTE) radio access technology (RAT) and slot refers to a transmission time unit for a new radio (NR) RAT. For example, the slot duration can be a sub-multiple of the SF duration. NR can use a different DL or UL slot structure than an LTE SF structure. Differences can include a structure for transmitting physical downlink control channels (PDCCHs), locations and structure of demodulation reference signals (DM-RS), transmission duration, and so on. Further, eNB refers to a base station serving UEs operating with LTE RAT and gNB refers to a base station serving UEs operating with NR RAT. Exemplary embodiments consider a same numerology, that includes a sub-carrier spacing (SCS) configuration and a cyclic prefix (CP) length for an OFDM symbol, for transmission with LTE RAT and with NR RAT. In such case, OFDM symbols for the LTE RAT as same as for the NR RAT, a subframe is same as a slot and, for brevity, the term slot is subsequently used in the remaining of the disclosure.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu}\cdot 15$ kHz. A unit of one sub-carrier over one symbol is referred to as resource element (RE). A unit of one RB over one symbol is referred to as physical RB (PRB).

DL signaling include physical downlink shared channels (PDSCHs) conveying information content, PDCCHs conveying DL control information (DCI), and reference signals (RS). A PDCCH can be transmitted over a variable number of slot symbols including one slot symbol and over a number of control channel elements (CCEs) from a predetermined set of numbers of CCEs referred to as CCE aggregation level within a control resource set (CORESET) as described in REF1 and REF3.

Figure 5:
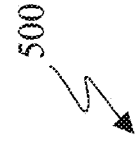
FIG. 5 illustrates a block diagram of an example transmitter structure using orthogonal frequency-division multiplexing (OFDM) according to embodiments of the present disclosure.
Figure 5:
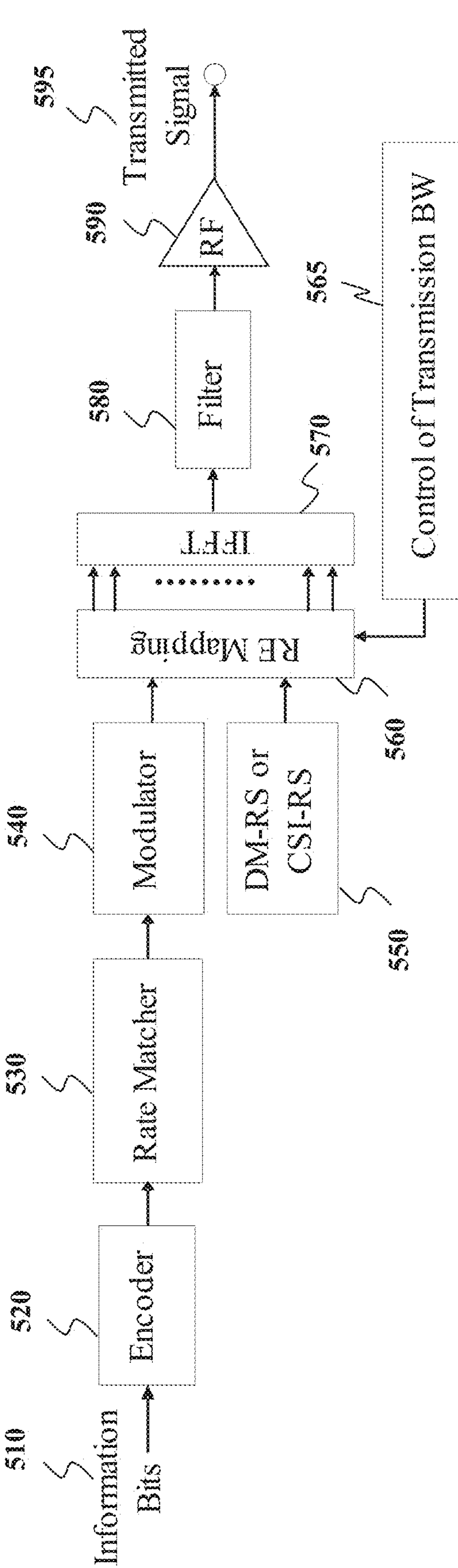

FIG. 5 illustrates a block diagram of an example transmitter structure 500 using OFDM according to this disclosure. The embodiment of the example transmitter structure 500 illustrated in FIG. 5 is for illustration only. FIG. 5 does not limit the scope of this disclosure to any particular implementation of the example transmitter structure 500.

Information bits, such as DCI bits or data bits 510, are encoded by encoder 520, rate matched to assigned time/frequency resources by rate matcher 530, and modulated by modulator 540. Subsequently, modulated encoded symbols and DM-RS or CSI-RS 550 are mapped to REs 560 by RE mapping unit 565, an inverse fast Fourier transform (IFFT) is performed by filter 570, a cyclic prefix (CP) is added by CP insertion unit 580, and a resulting signal is filtered by filter 590 and transmitted by a radio frequency (RF) unit 595. In embodiments, the transmitter structure 500 may be used to facilitate methods and an apparatus for configuration and activation of cell DTX and DRX.

Figure 6:
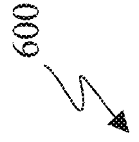
FIG. 6 illustrates a block diagram of an example receiver structure using OFDM according to embodiments of the present disclosure.
Figure 6:
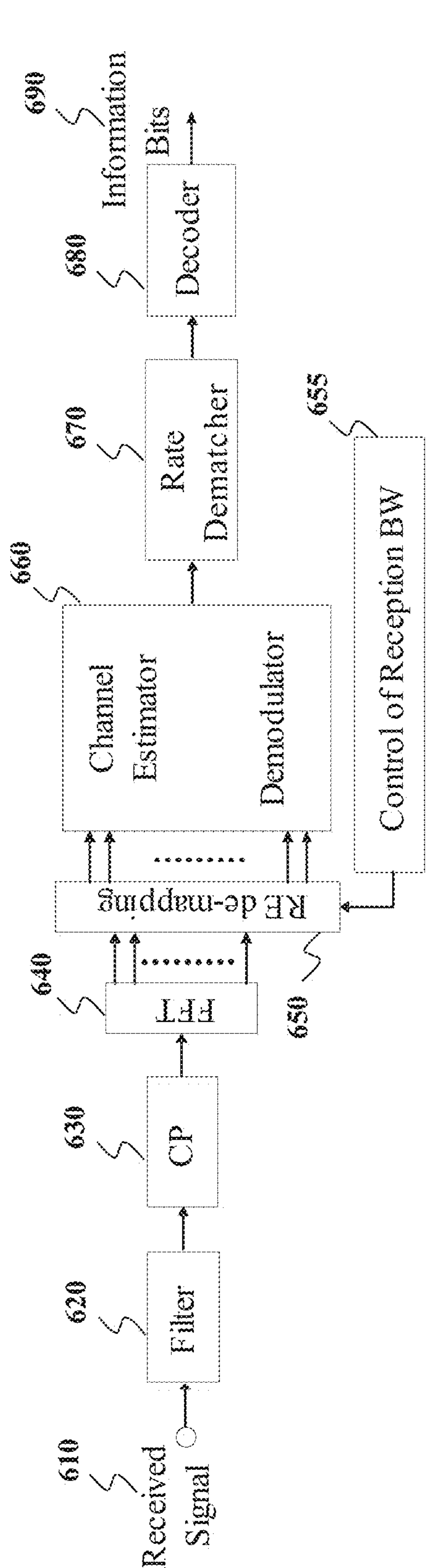

FIG. 6 illustrates a block diagram of an example receiver structure 600 using OFDM according to this disclosure. The embodiment of the example receiver structure 600 illustrated in FIG. 6 is for illustration only. FIG. 6 does not limit the scope of this disclosure to any particular implementation of the example receiver structure 600.

A received signal 610 is filtered by filter 620, a CP removal unit removes a CP 630, a filter 640 applies a fast Fourier transform (FFT), RE de-mapping unit 650 de-maps REs selected by BW selector unit 655, received symbols are demodulated by a channel estimator and a demodulator unit 660, a rate de-matcher 670 restores a rate matching, and a decoder 680 decodes the resulting bits to provide information bits 690. In embodiments, the receiver structure 600 may be used to facilitate methods and an apparatus for configuration and activation of cell DTX and DRX.

DCI can serve several purposes. A DCI format includes information elements (IEs) and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE with RRC connection to a gNB, the RNTI is a cell RNTI (C-RNTI) or another RNTI type such as a MCS-C-RNTI. For a DCI format scheduling a PDSCH conveying system information (SI) to a group of UEs, the RNTI is a SI-RNTI. For a DCI format scheduling a PDSCH providing a response to a random access (RA) from a group of UEs, the RNTI is a RA-RNTI. For a DCI format scheduling a PDSCH providing contention resolution in Msg4 of a RA process, the RNTI is a temporary C-RNTI (TC-RNTI). For a DCI format scheduling a PDSCH paging a group of UEs, the RNTI is a P-RNTI. For a DCI format providing transmission power control (TPC) commands to a group of UEs, the RNTI is a TPC-RNTI, and so on. Each RNTI type is configured to a UE through higher layer signaling. A UE typically decodes at multiple candidate locations for potential PDCCH transmissions.

Figure 7:
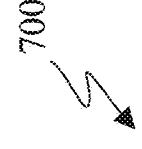
FIG. 7 illustrates a block diagram of an example encoding process for a downlink control information (DCI) format according to embodiments of the present disclosure.
Figure 7:
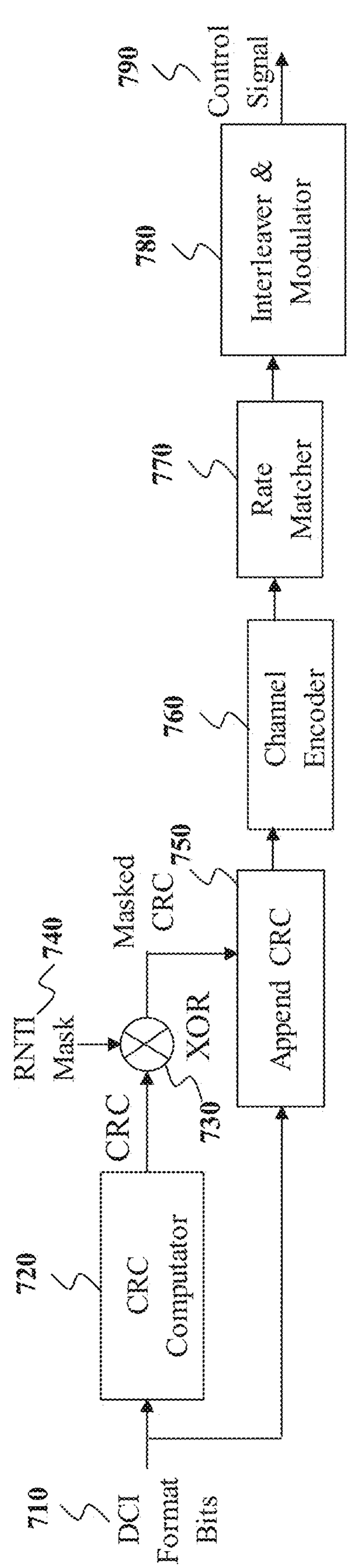

FIG. 7 illustrates a block diagram of an example encoding process 700 for a DCI format according to this disclosure. The embodiment of the example encoding process 700 illustrated in FIG. 7 is for illustration only. FIG. 7 does not limit the scope of this disclosure to any particular implementation of the example encoding process 700.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 24 bits and the RNTI can include 16 bits or 24 bits. The CRC of (non-coded) DCI format bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR(1,1)=0. The masked CRC bits are appended to DCI format information bits using a CRC append unit 750. An encoder 760 performs channel coding, such as polar coding, followed by rate matching to allocated resources by rate matcher 770. Interleaving and modulation units 780 apply interleaving and modulation, such as QPSK, and the output control signal 790 is transmitted. In embodiments, the encoding process 700 may be used to facilitate methods and an apparatus for configuration and activation of cell DTX and DRX.

Figure 8:
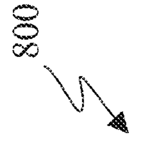
FIG. 8 illustrates a block diagram of an example decoding process for a DCI format for use with a UE according to embodiments of the present disclosure.
Figure 8:
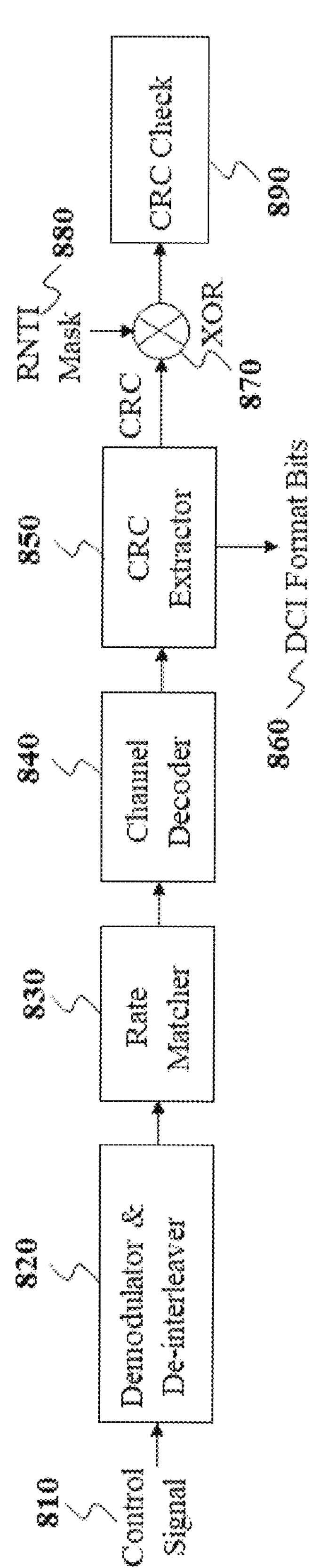

FIG. 8 illustrates a block diagram of an example decoding process 800 for a DCI format for use with a UE according to this disclosure. The embodiment of the example decoding process 800 illustrated in FIG. 8 is for illustration only. FIG. 8 does not limit the scope of this disclosure to any particular implementation of the example decoding process 800.

A received control signal 810 is demodulated and de-interleaved by a demodulator and a de-interleaver 820. A rate matching applied at a gNB transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are considered to be valid. When the CRC check does not succeed, the DCI format information bits are considered to be invalid. In embodiments, the decoding process 800 may be used to facilitate methods and an apparatus for configuration and activation of cell DTX and DRX.

For each DL bandwidth part (BWP) indicated to a UE in a serving cell, the UE can be provided by higher layer signaling with $P<3$ control resource sets (CORESETs). For each CORESET, the UE is provided a CORESET index p, $0\leq p<12$, a DM-RS scrambling sequence initialization value, a precoder granularity for a number of resource element groups (REGs) in the frequency domain where the UE can assume use of a same DM-RS precoder, a number of consecutive symbols for the CORESET, a set of resource blocks (RBs) for the CORESET, CCE-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field for DCI format 1_1 transmitted by a PDCCH in CORESET p.

For each DL BWP configured to a UE in a serving cell, the UE is provided by higher layers with S≤10 search space sets. For each search space set from the S search space sets, the UE is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s<k_s$ slots indicating a number of slots that the search space set s exists, a number of PDCCH candidates $$M_s^{(L)}$$

per CCE aggregation level L, and an indication that search space set s is either a CSS set or a USS set. When search space set s is a CSS set, the UE monitors PDCCH for detection of DCI format 2_x, where x ranges from 0 to 7 as described in REF2, or for DCI formats associated with scheduling broadcast/multicast PDSCH receptions, and possibly for DCI format 0_0 and DCI format 1_0.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.$$

The UE monitors PDCCH candidates for search space set s for $T_s$ consecutive slots, starting from slot $$n_{s,f}^{\mu},$$

and does not monitor PDCCH candidates for search space set s for the next $k_s-T_s$ consecutive slots. The UE determines CCEs for monitoring PDCCH according to a search space set based on a search space equation as described in REF3.

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving/scheduled cell based on a number of PDCCH candidates in respective search space sets for the corresponding active DL BWP. In the following, for brevity, that constraint for the number of DCI format sizes will be referred to as DCI size limit. When the DCI size limit would be exceeded for a UE based on a configuration of DCI formats that the UE monitors PDCCH, the UE aligns the size of some DCI formats, as described in REF2, so that the DCI size limit would not be exceeded.

For each scheduled cell, the UE is not required to monitor on the active DL BWP with SCS configuration μ of the scheduling cell more than $$\min\left(M_{PDCCH}^{max,slot,\mu}, M_{PDCCH}^{total,slot,\mu}\right)$$

PDCCH candidates or more than $$\min\left(C_{PDCCH}^{max,slot,\mu}, C_{PDCCH}^{total,slot,\mu}\right)$$

non-overlapped CCEs per slot, wherein $$M_{PDCCH}^{max,slot,\mu} \text{ and } C_{PDCCH}^{max,slot,\mu}$$

are respectively a maximum number of PDCCH candidates and non-overlapping CCEs for a scheduled cell and $$M_{PDCCH}^{total,slot,\mu} \text{ and } C_{PDCCH}^{total,slot,\mu}$$

are respectively a total number of PDCCH candidates and non-overlapping CCEs for a scheduling cell, as described in REF3.

A UE does not expect to be configured CSS sets, other than CSS sets for multicast PDSCH scheduling, that result to corresponding total, or per scheduled cell, numbers of monitored PDCCH candidates and non-overlapped CCEs per slot on the primary cell that exceed the corresponding maximum numbers per slot. For USS sets or for CSS sets associated with multicast PDSCH scheduling, when a number of PDCCH candidates or non-overlapping CCEs in a slot would exceed the aforementioned limits/maximum per slot for scheduling on the primary cell, the UE selects the USS sets or the CSS sets to monitor corresponding PDCCH in an ascending order of a corresponding search space set index until and an index of a search space set for which PDCCH monitoring would result to exceeding the maximum number of PDCCH candidates or non-overlapping CCEs per slot for scheduling on the PCell as described in REF3.

For same cell scheduling or for cross-carrier scheduling where a scheduling cell and scheduled cells have DL BWPs with same SCS configuration μ, a UE does not expect a number of PDCCH candidates, and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

A UE can be configured for operation with carrier aggregation (CA) for PDSCH receptions over multiple cells (DL CA) or for PUSCH transmissions over multiple cells (UL CA). The UE can also be configured multiple transmission-reception points (TRPs) per cell via indication (or absence of indication) of a coresetPoolIndex for CORESETs where the UE receives PDCCH/PDSCH from a corresponding TRP as described in REF3 and REF4.

Present networks have limited capability to adapt an operation state in one or more of time/frequency/spatial/power domains. For example, in NR, there are transmissions or receptions by a serving gNB that are expected by UEs, such as transmissions of SS/PBCH blocks, or of system information, or of CSI-RS indicated by higher layers, or receptions of physical random access channel (PRACH) or sounding reference signal (SRS) indicated by higher layers. Reconfiguration of a network (NW) operation state involves higher layer signaling by a system information block (SIB) or by UE-specific radio resource control (RRC). That is a slow process and requires substantial signaling overhead, particularly for UE-specific RRC signaling. For example, it is currently not practical or possible for a network in typical deployments to enter an energy saving state where the network does not transmit or receive due to low traffic as, in order to obtain material energy savings, the network needs to suspend transmissions or receptions for several tens of milliseconds and preferably for even longer time periods. A similar inability exists for suspending transmissions or receptions for shorter time periods as a serving gNB may need to frequently transmit SS/PBCH blocks, such as every 5 msec or every 20 msec and, in TDD systems with UL-DL configurations having few UL symbols in a period, the serving gNB may need to receive PRACH or SRS in most UL symbols in a period.

Due to the above reasons, adaptation of a NW operation state is typically over long time periods, for example, for off-peak hours when an amount of served traffic is small and for peak hours when an amount of served traffic is large. Therefore, a gNB is limited in its ability to improve service by fast adaptation of a NW operation state to the traffic types and load or to save energy by switching to a state that requires less energy consumption when an impact on service quality would be limited or none. Such limitation exists since there are no procedures for a serving gNB to perform fast adaptation of a NW operation state with small signaling overhead while simultaneously informing all UEs of the NW operation state.

This disclosure recognizes that it would be beneficial to support a gradual transition of NW operation states between a maximum state where the NW operates at its maximum capability in one or more of a time/frequency/spatial/power domain and a minimum state where the NW operates at its minimum capability, or the NW enters a sleep mode. That would allow continuation of service while the NW transitions from a state with larger utilization of time/frequency/spatial/power resources to a state with lower utilization of such resources and the reverse as UEs can obtain time/frequency synchronization and automatic gain controller (AGC) alignments, perform measurements and provide CSI reports or transmit SRS prior to scheduling of PDSCH receptions or PUSCH transmissions.

In order to allow the gNB to sleep and, thereby, to save energy, DTX and DRX from a network perspective can be defined for a serving cell. UEs in the cell can be informed of the corresponding cell DTX/DRX configurations such that the UEs can operate accordingly and avoid power consumption when the serving gNB is in dormancy. By turning off all or a part of a transmission chain and pausing transmission during the cell DTX, the gNB can reduce the energy consumption for standby when there is little to no traffic. According to the definition of the cell DTX, UEs may assume that all the transmissions from a serving gNB are suspended or the UEs may assume that some signals essential to maintain synchronization, such as SSB, are still present during the cell DTX. By turning off all or a part of receiver chain and pausing receptions during the cell DRX, the gNB can reduce the energy consumption for standby when there is little to no traffic. According to the definition of the cell DRX, UEs may assume that all transmissions from the UEs are suspended or may assume that some transmissions, such as ones required for initial access such as PRACH, are allowed during a cell DRX duration.

Figure 9:
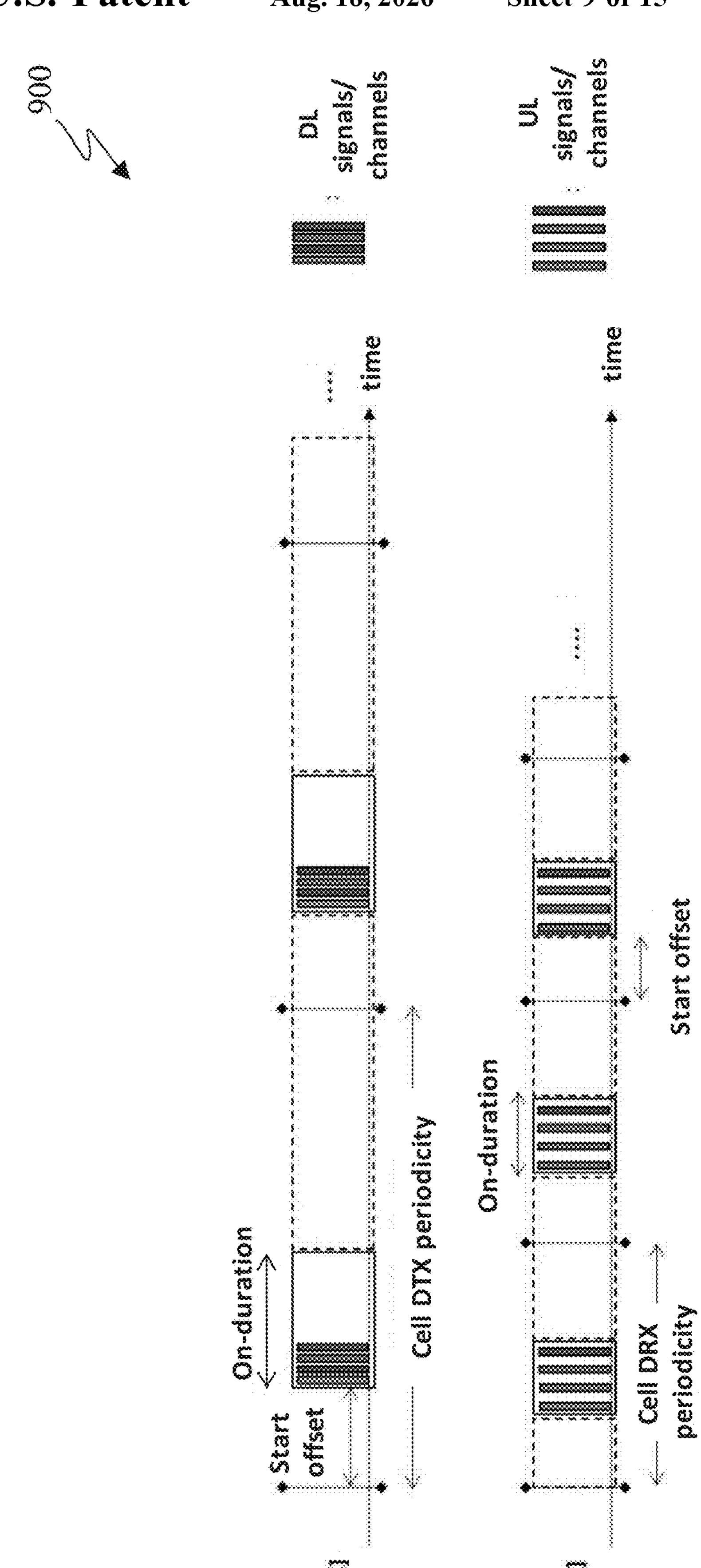
FIG. 9 illustrates a bock diagram of cell DTX/DRX according to embodiments of the present disclosure.

FIG. 9 illustrates a diagram 900 of cell DTX/DRX according to embodiments of this disclosure. The embodiment of the diagram 900 of cell DTX/DRX is for illustration only. FIG. 9 does not limit the scope of this disclosure to any particular implementation of the diagram 900 of cell DTX/DRX.

As illustrated in FIG. 9, cell DTX/DRX can be configured via at least a periodicity, start slot/offset, and on-duration during which all transmissions/receptions by the gNB (e.g., gNB 102) are assumed to be enabled. The configurations and operations of cell DTX and cell DRX can be linked or can be separate and that may depend on the traffic characteristics in the DL and the UL.

In order to adapt to time-varying traffic loads, it is beneficial for a network (e.g., wireless network 100) to have a capability for fast switching between a set of cell DTX/DRX configurations or for activating/deactivating cell DTX/DRX. In addition to a time domain DL/UL dormancy pattern for a serving gNB (e.g., gNB 102), a cell DTX/DRX configuration may also include other parameters related to network operation in any of time, frequency, spatial, and power domain. From the perspective of energy consumption or signaling overhead, it is not preferable for a serving gNB to transmit signaling informing cell DTX/DRX parameters to UEs every time the serving gNB activates or deactivates cell DTX/DRX and such signaling may also slow the overall adaptation process between network operation states. Therefore, there is a need for defining procedures and methods to enable with low energy consumption and signaling overhead the configuration of cell DTX/DRX parameters to UEs, and to enable fast switching among multiple cell DTX/DRX configurations or fast activation/deactivation of cell DTX/DRX.

This disclosure recognizes that indicating to UEs (e.g., UE 114, UE 115) cell DTX/DRX activation/deactivation, or switching among multiple configurations of network operating states, requires an associated signaling overhead. Moreover, to ensure that all UEs in the cell, or in a group of UEs, have correctly received the indication with high probability, the reception reliability for the indication needs to be high and signaling overhead will be further increased. However, explicit signaling for the indication can also restrict prompt transitions between energy saving mode by a serving gNB as the gNB (e.g., 102) needs to wait for a transition until the signaling procedure is completed. Therefore, there is a need for defining a default UE operation that does not require explicit signaling for an indication, e.g., based on timer, for cell DTX/DRX switching or for activation/deactivation to a default cell DTX/DRX.

As this disclosure recognizes, the cell DTX and DRX can be separately or jointly configured. Some parameters may be shared between cell DTX and DRX while some other parameters may only apply to one or the other. Therefore, there is a need to define a set of information elements provided by higher layers to configure cell DTX and cell DRX parameters to UEs. For cell DTX/DRX activation/deactivation or switching, separately indicating a cell DTX configuration from a set of configurations, and a cell DRX configuration from a set of configurations, can be inefficient. Therefore, there is another need for providing a method for pairing a cell DTX configuration from a first set of configurations with a cell DRX configuration from a second set of configurations.

As this disclosure also recognizes, in order to promptly adapt to varying traffic volume, it is beneficial to define a signaling method for fast cell DTX/DRX activation/deactivation or switching. While UE-specific signaling can provide cell DTX/DRX configuration to UEs with some parameters tailored to each UE, a group/cell common signaling can significantly reduce signaling overhead given that the cell DTX/DRX operation by the serving gNB will apply to UEs in a cell or a group and can also reduce adaptation latency for DTX/DRX operation as it enables informing all UEs at once. Therefore, there is a need for defining cell activation/deactivation signaling mechanisms using cell-common or UE-group common MAC-CE or DCI while also enabling support by UE-specific MAC CE or DCI that can be used for example in case few UEs communicate with a serving gNB on a serving cell.

In conjunction with a UL/DL carrier pair (FDD band) or a bidirectional carrier (TDD band), a UE (e.g., UE 114) may be configured with additional, Supplementary Uplink (SUL). In case of Supplementary Uplink, the UE is configured with 2 ULs for one DL of the same cell. Therefore, if a serving cell is paired with SUL, there is a need to define procedures to provide one or more of cell DRX configurations to the UE and activation/deactivation signaling mechanism for SUL.

When there is an on-going data transmission and HARQ processes, the serving gNB may want to extend the current cell DTX/DRX on-duration or entirely skip the next cell DTX/DRX off-duration to serve the traffic without increasing latency. Similarly, if the serving gNB expects little to no traffic to occur, the serving gNB may want to extend the following cell DTX/DRX off-duration or entirely skip the next cell DTX/DRX on-duration to further save the network energy. Therefore, there is a need to define a signaling method for fast indication of extending or skipping cell DTX/DRX on-duration or off-duration.

A serving cell can configure a UE to perform neighboring cell measurement and reporting per measurement configuration including intra/inter-RAT and intra/inter-frequencies. A UE can be configured to use SSB or CSI-RS for the measurement. When CSI-RS is used for neighboring cell measurement, the referenceSignalConfig in the MeasObject points to a CSI-RS resource configuration with a corresponding cell ID, measurement bandwidth, and slot configuration for the measurement. When SSB is used for neighboring cell measurement, SSB configuration pointed by referenceSignalConfig and SMTC (SSB measurement timing configuration) are provided to UE. When the neighboring cell is in Cell DTX and, thereby, SSB or CSI-RS is not transmitted as indicated by slotConfig, the UE may result in an erroneous averaging of measurements. Therefore, there is a need to define a mechanism to indicate neighboring cells' cell DTX information to UEs for measurement purpose.

This disclosure provides definitions of functionalities and procedures for cell DTX and DRX. This disclosure also defines procedures and methods for efficiently configuring cell DTX/DRX parameters to UEs and enabling fast switching between multiple cell DTX/DRX configurations or activating/deactivating the cell DTX/DRX. This disclosure will also define a default UE operation, which does not require an explicit signaling, e.g., based on timer, for cell DTX/DRX switching or activation/deactivation to a default cell DTX/DRX configuration. Furthermore, this disclosure defines a set of information elements consisting higher layer signaling to efficiently configure cell DTX and cell DRX parameters to UEs, and further relates to providing a method for flexibly pairing one cell DTX configuration from a set of configurations with another cell DRX configuration from another set of configurations. This disclosure further provides a fast and efficient cell activation/deactivation mechanism using MAC-CE or DCI, which may be UE-specific or cell/group common. Additionally, this disclosure defines procedures for activating/deactivating cell DRX when a serving cell is paired with SUL. In more embodiments of this disclosure, a fast and efficient indication mechanism for extending or skipping cell DTX/DRX on-duration or off-duration using DCI, which may be UE-specific or cell/group common, is provided. This disclosure provides in additional embodiments a procedure for exchanging cell DTX/DRX configuration information among neighboring cells over interfaces between the gNBs and indicating neighboring cells' cell DTX/DRX information to UEs for measurement purpose.

A general principle for cell DTX/DRX includes a serving gNB indicating to a UE one or multiple sets of cell DTX/DRX configurations by higher layer signaling, such as by SIB or UE-specific RRC signaling, and activating a certain cell DTX/DRX configuration by indicating an index to the set of indicated cell DTX/DRX configurations by PDCCH providing DCI, PDSCH providing MAC-CE or RRC signaling for the UE to determine updated cell DTX/DRX parameters. The signaling for activating and deactivating cell DTX/DRX configuration can be UE-specific, or cell-specific, or UE-group-specific.

Figure 10:
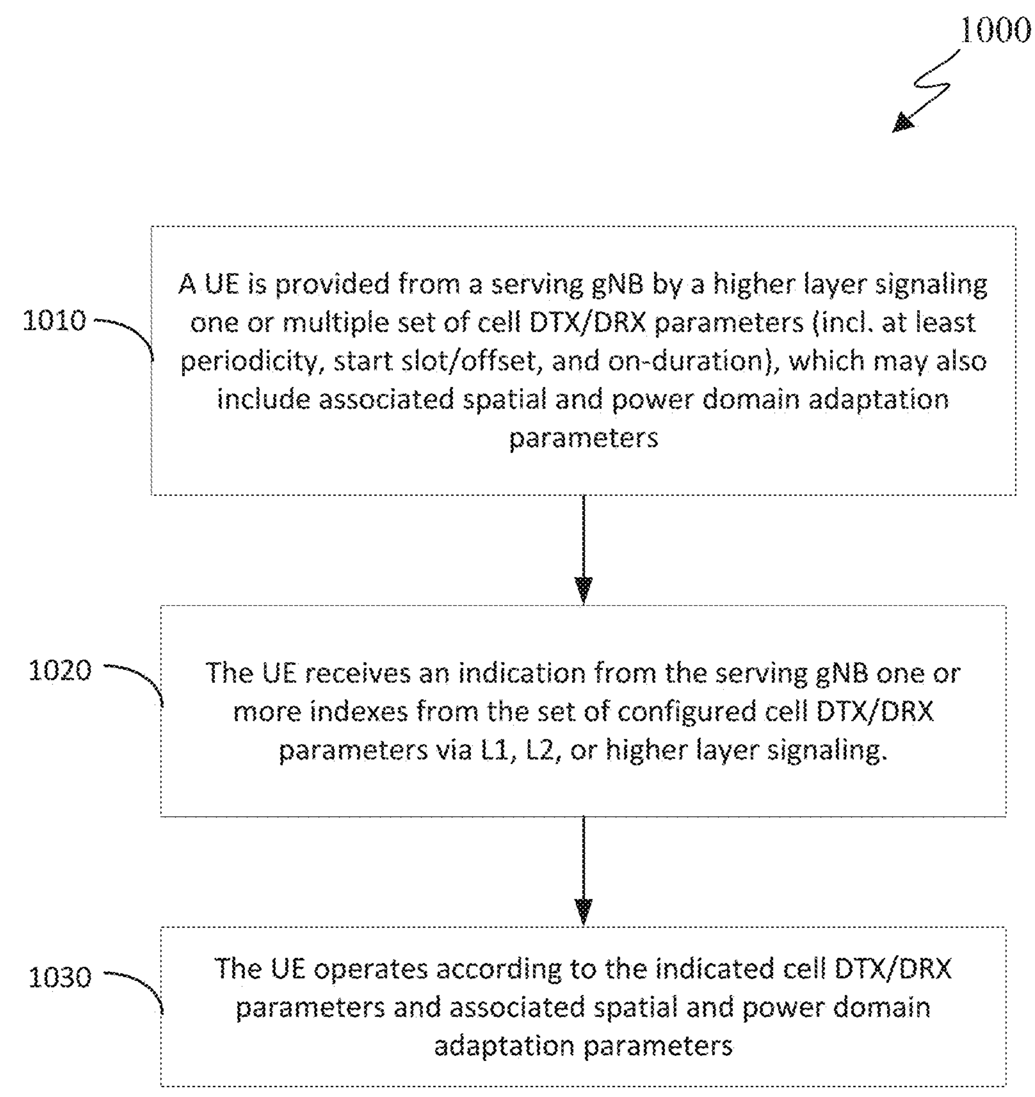
FIG. 10 illustrates a flowchart for a UE to receive and activate cell DTX/DRX configuration according to embodiments of the present disclosure.

FIG. 10 illustrates a flowchart of a method 1000 for a UE to receive and activate cell DTX/DRX configuration according to embodiments of this disclosure. The embodiment of the method 1000 is for illustration only. FIG. 10 does not limit the scope of this disclosure to any particular implementation of the method 1000.

At step 1010, a UE (e.g., 114) is provided from a serving gNB (e.g., 102) by a higher layer signaling one or multiple set of cell DTX/DRX parameters (incl. at least periodicity, start slot/offset, and on-duration), which may also include associated spatial and power domain adaptation parameters. At 1020, the UE receives an indication from the serving gNB one or more indexes from the set of configured cell DTX/DRX parameters via L1, L2, or higher layer signaling. At 1030, the UE operates according to the indicated cell DTX/DRX parameters and associated spatial and power domain adaptation parameters. The method 1000 may be implemented as instructions stored on a memory (e.g., 230) of one or more gNBs and a memory (e.g., 360) of one or more UEs and executed using a processor of the one or more gNBs (e.g., processor 225) or the one or more UEs (e.g., processor 340).

In further detail, at 1010, a UE is provided from a serving gNB by a higher layer signaling one or multiple sets of cell DTX/DRX parameters per serving cell or per group of serving cells. Cell DTX/DRX configuration parameters include at least periodicity, start slot/offset, and on-duration. A first subset of cell DTX/DRX parameters can be shared between DTX and DRX and a second subset of DTX/DRX parameters can be separately configured, if provided.

When the serving cell is paired with SUL, for instance if the supplementaryUplink is indicated in ServingCellConfig or ServingCellConfigCommonSIB, the UE may assume that the same set of cell DRX configurations provided for the serving cell apply to the paired SUL. In embodiments, the UE may be provided a separate set of cell DRX configurations for the SUL apart from the set of cell DTX/DRX configurations for the paired serving cell.

When the UE is configured with more than one serving cells, the cell DTX/DRX configurations can be provided per serving cell or cell group. As an example, the UE can be configured with one or more of cell groups, e.g., a default cell group and a secondary cell group. The provided cell DTX/DRX configurations will be common for all the cells within the same cell group. If the UE is configured with only a default cell group, then the provided cell DTX/DRX configurations will be common for all the serving cells that the UE is configured with.

The higher layer signaling can also include other associated time, frequency, spatial and power domain adaptation parameters together with a cell DTX/DRX configuration.

In power domain, for example, a first cell DTX/DRX configuration can be associated with a first value of parameter ss-PBCH-BlockPower providing an average energy per resource element (EPRE) with secondary synchronization signals (SSS) in dBm, and a second cell DTX/DRX configuration can be associated with a second value of a parameter ss-PBCH-BlockPower. For example, first and second cell DTX/DRX configuration can be respectively associated with first and second values of parameter powerControlOffsetSS that provides a power offset (in dB) of non-zero power (NZP) CSI-RS RE to SSS RE. For example, first and second cell DTX/DRX configurations can be respectively associated with first and second values of parameter powerControlOffset that provides the assumed ratio of PDSCH EPRE to NZP CSI-RS EPRE when UE derives CSI feedback in dB. In another example, a cell DTX/DRX configuration can be associated with one or more values of parameter powerControlOffset and the UE is indicated to provide multiple CSI reports based on the indicated set of powerControlOffset parameter values.

In spatial domain, for example, first and second cell DTX/DRX configurations can be respectively associated with first and second values of a parameter maxMIMO-Layers that indicates a maximum number of MIMO layers to be used for PDSCH receptions by a UE in the associated active DL BWP, or with first and second values of a parameter nrOfAntennaPorts that indicates a number of antenna ports to be used for codebook determination for PDSCH receptions, or with first and second values of a parameter ng that indicates a number of panels to be used for codebook determination for PDSCH receptions, or with first and second values of a parameter activeCoresetPoolIndex that coresetPoolIndex values for PDCCH transmissions in corresponding CORESETs and UEs can skip PDCCH receptions in a CORESET with coresetPoolIndex value that is not indicated by activeCoresetPoolIndex. In another example, a cell DTX/DRX configuration can be associated one or more values of parameter nrOfAntennaPorts and the UE is indicated to provide multiple CSI reports assuming indicated set of nrOfAntennaPorts parameter values.

At 1020, the UE receives an indication from the serving gNB for one or more indexes from the set of configured cell DTX/DRX parameters via L1, MAC CE, or RRC signaling for the activation of cell DTX/DRX configurations provided by higher layer signaling. The L1, MAC CE, or RRC signaling can be also used by the serving gNB for deactivation of an activated cell DTX/DRX configuration by indicating a predefined or configured codepoint, e.g., '0'. When the UE is provided only one set of cell DTX/DRX parameters, then bit value '1' in the indication indicates activation of the cell DTX or cell DRX.

The cell DTX/DRX provided and activated using RRC signaling, e.g., SIB or UE-specific RRC, is referred to as Type 1 cell DTX/DRX in this embodiment of the disclosure for brevity. The cell DTX/DRX provided by RRC signaling and activated by L1/MAC CE signaling, e.g., UE-specific or cell-specific or UE-group-specific DCI or MAC-CE, is referred to as Type 2 cell DTX/DRX in this embodiment of the disclosure for brevity. When the serving cell is paired with SUL, the UE may assume that the activation/deactivation is common for the serving cell and the paired SUL both for Type 1 and Type 2 activation/deactivation mechanisms. Alternatively, the activation/deactivation of cell DRX can be indicated to the UE separately for the serving cell and the paired SUL.

At 1030, once the UE is activated a certain cell DTX/DRX configuration either by Type 1 or Type 2 signaling, the UE operates according to the activated cell DTX/DRX configuration and associated spatial and power domain adaptation parameters, if provided, until the DTX/DRX configuration is deactivated 930. The deactivation can be done using the same signaling as for activation by indicating a certain predefined or configured codepoint for deactivation, e.g., '0'.

Figures 11, 12:
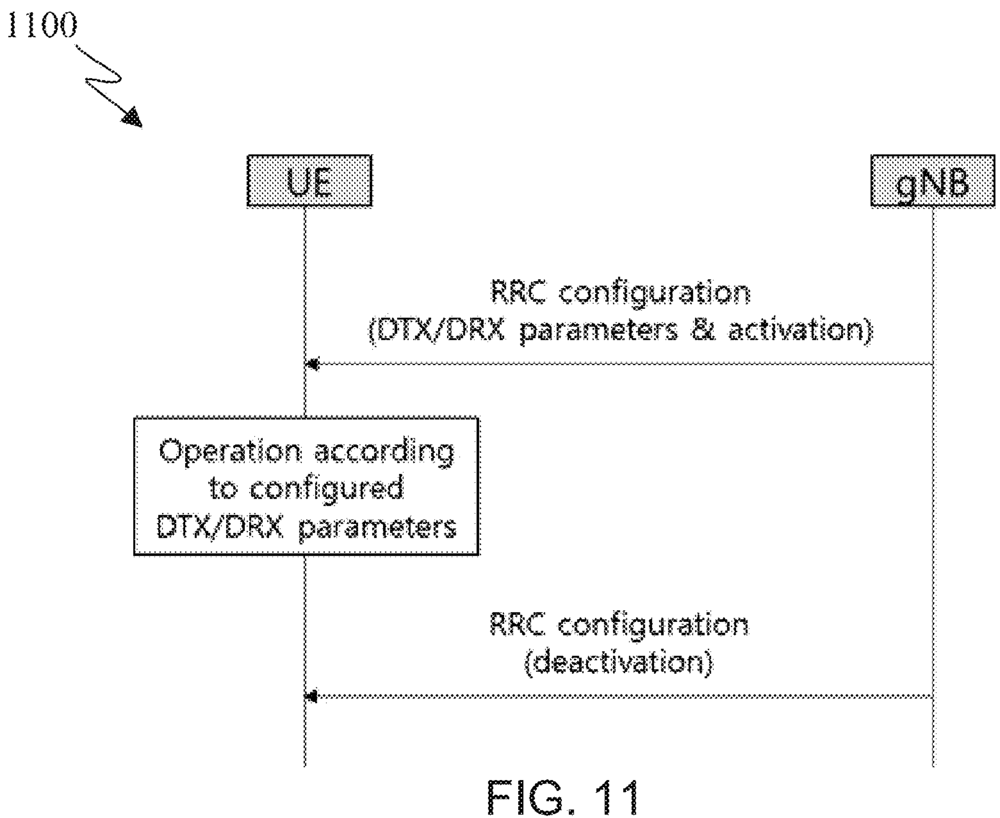
FIG. 11 illustrates a diagram of Type 1 DTX/DRX activation using radio resource control (RRC) according to embodiments of the present disclosure.
FIG. 12 illustrates a diagram of Type 2 DTX/DRX activation using DCI or medium access control-control element (MAC-CE) according to embodiments of the present disclosure.

FIG. 11 illustrates a diagram 1100 of an example procedure (Type 1 cell DTX/DRX activation using RRC) for a gNB to provide and for a UE to receive a cell DTX/DRX configuration by higher layer signaling (e.g., using RRC) according to the disclosure. Activation and deactivation of a DTX/DRX configuration is based on higher layer signaling. The embodiment of the diagram 1100 is for illustration only. FIG. 11 does not limit the scope of this disclosure to any particular implementation of the diagram 1100.

FIG. 12 illustrates a diagram 1200 of another example procedure (e.g., Type 2 cell DTX/DRX activation using DCI or MAC-CE) for a gNB to provide and for a UE to receive a cell DTX/DRX configuration by higher layer signaling, and an activation and deactivation indication of a cell DTX/DRX configuration using L1/L2 signaling, e.g., UE-specific or cell-specific or UE-group-specific DCI or MAC-CE, also referred to as Type 2 indication, according to this disclosure. The embodiment of the diagram 1200 is for illustration only. FIG. 12 does not limit the scope of this disclosure to any particular implementation of the diagram 1200.

In Type 2 indication for a cell DTX/DRX configuration, a UE may be provided a full set of cell DTX/DRX parameters or only a subset of those parameters via higher layer signaling. DCI/MAC-CE activating a DTX/DRX configuration can indicate a remaining subset of cell DTX/DRX parameters and may also indicate an update to parameters that were previously provided by higher layer signaling such as RRC signaling.

A serving gNB may not transmit a Type 1 or a Type 2 cell DTX/DRX deactivation message, for example in order to reduce signaling overhead or because it can be beneficial for the serving gNB to transition to a dormant state immediately and save energy without additional delays associated with a Type 1 or Type 2 cell DTX/DRX deactivation process. For example, the gNB can transit to the dormant state without signaling when there are no UEs with traffic for the serving gNB to communicate with. A default UE operation needs to be defined for the case that the serving gNB does not transmit the above message or for the case that the gNB transmits the message and a UE fails to correctly receive the message.

Figure 13:
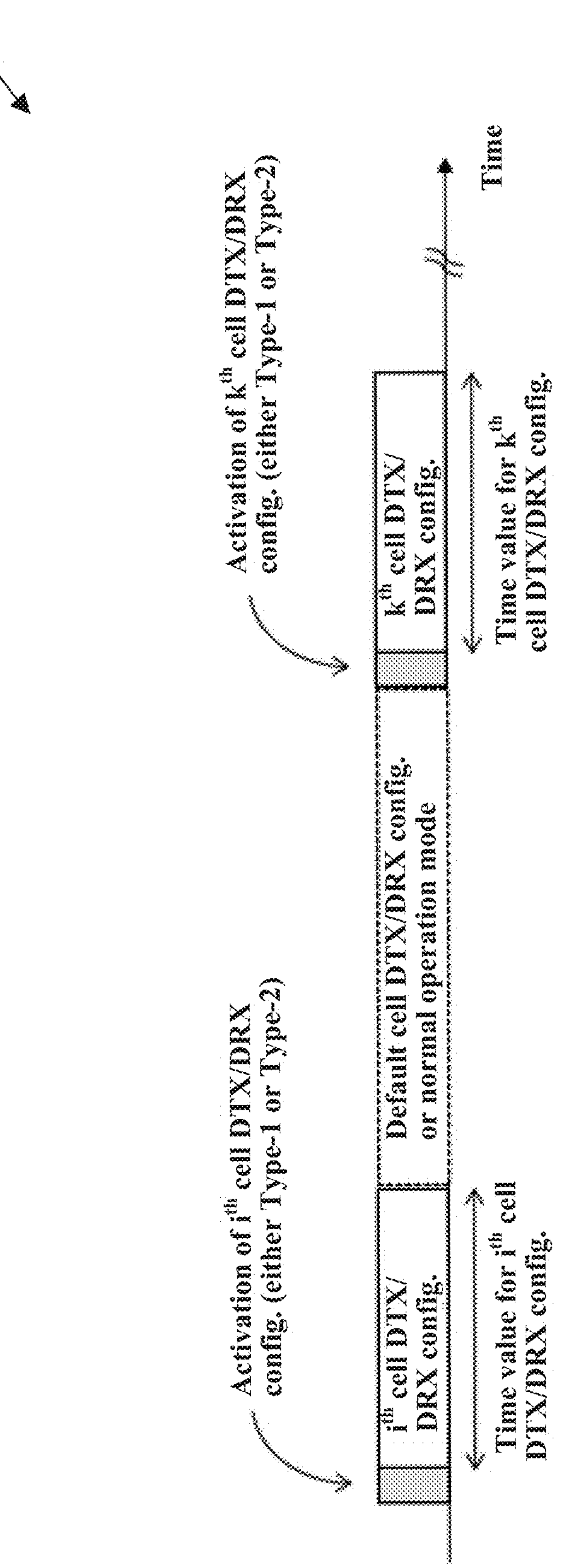
FIG. 13 illustrates a diagram of timer-based cell DTX/DRX switching according to embodiments of the present disclosure.

FIG. 13 illustrates a diagram 1300 of a timer based cell DTX/DRX switching. The embodiment of the diagram 1300 is for illustration only. FIG. 13 does not limit the scope of this disclosure to any particular implementation of the diagram 1300.

FIG. 13 illustrates a cell DTX/DRX transition, among a set of cell DTX/DRX configurations including a default cell DTX/DRX configuration, using a timer. When the UE is configured with more than one serving cells, the timer for cell DTX/DRX switching can be provided per serving cell or cell group. As an example, the UE can be configured with one or more of cell groups, e.g., a default cell group and a secondary cell group. Upon expiration of a timer for a cell group, the UE performs switching of cell DTX/DRX configurations for all the cells within the corresponding cell group.

Figure 14:
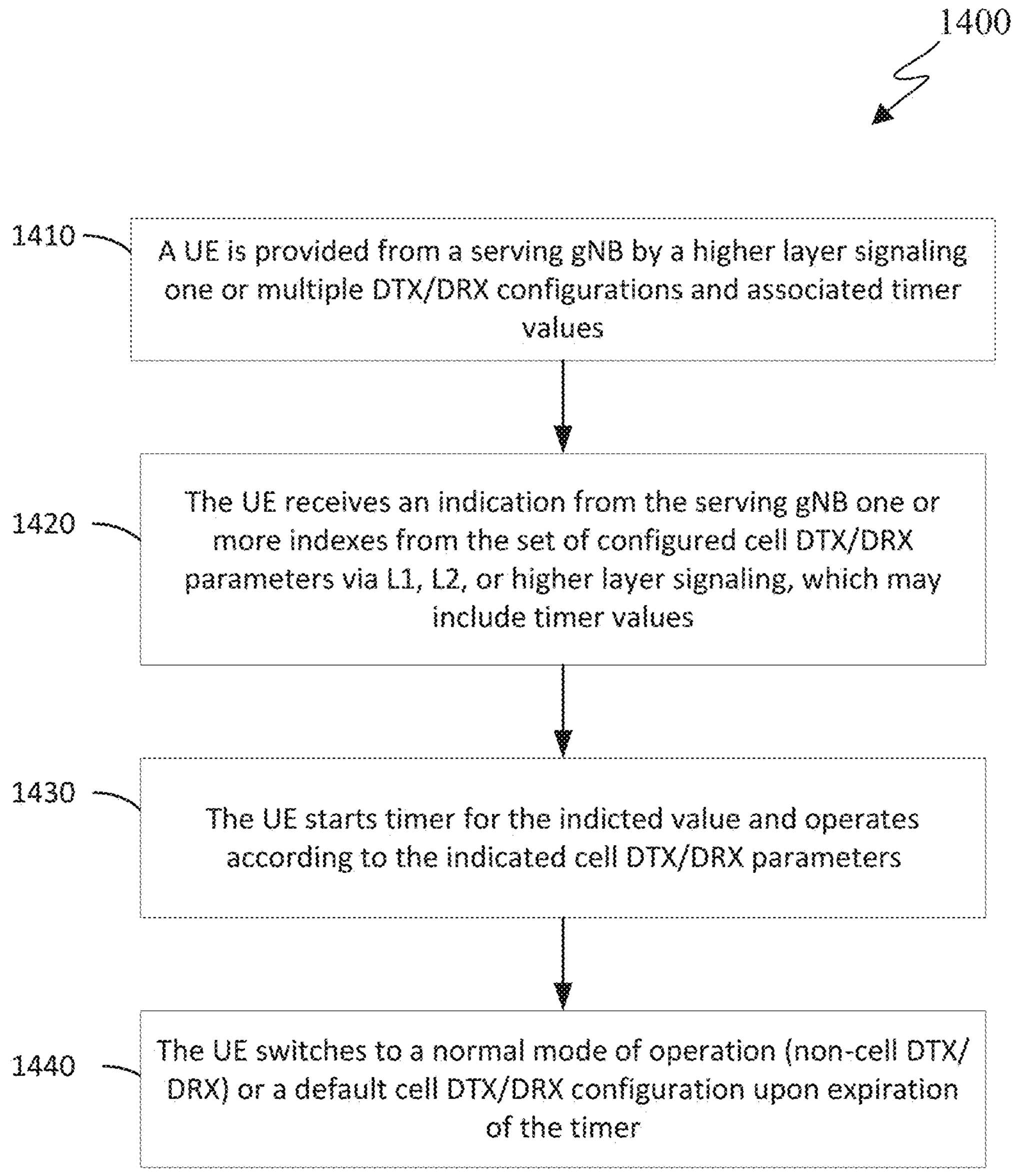
FIG. 14 illustrates a flowchart for a UE to perform timer-based cell DTX/DRX deactivation according to embodiments of the present disclosure.

FIG. 14 illustrates a flowchart of a method 1400 for a UE to perform timer-based cell DTX/DRX deactivation. The embodiment of the method 1400 is for illustration only. FIG. 14 does not limit the scope of this disclosure to any particular implementation of the method 1400. One or more steps of the method 1400 may be implemented via one or more gNBs (e.g., gNB 101, gNB 102) and one or more UEs (e.g., UE 114, UE 115), as instructions, stored a memory (e.g., memory 230 or memory 360) and executed by one or more processors (e.g., processor 225 or processor 340).

At 1410, a UE (e.g., UE 114) is provided from a serving gNB (e.g., 102) by a higher layer signaling one or multiple DTX/DRX configurations and associated timer values. At 1420, the UE receives an indication from the serving gNB one or more indexes from the set of configured cell DTX/DRX parameters via L1, L2, or higher layer signaling, which may include timer values. At 1430, the UE starts a timer for the indicted value and operates according to the indicated cell DTX/DRX parameters. At 1440, The UE switches to a normal mode of operation (non-cell DTX/DRX) or a default cell DTX/DRX configuration upon expiration of the timer. One or more steps of the method 1400 may be implemented via one or more gNBs (e.g., gNB 101, gNB 102) and one or more UEs (e.g., UE 114, UE 115), as instructions, stored a memory (e.g., memory 230 or memory 360) and executed by one or more processors (e.g., processor 225 or processor 340).

In additional detail, at 1410, a UE is provided from a serving gNB by a higher layer signaling one or multiple cell DTX/DRX configurations and associated timer values. The one or multiple cell DTX/DRX configurations can include a default cell DTX/DRX configuration. In one example, a default cell DTX/DRX configuration may correspond to a normal mode of operation (non-cell DTX/DRX). In another example, a default cell DTX/DRX configuration may correspond to any of the higher layer signaled cell DTX/DRX configurations. As an example, a default cell DTX/DRX configuration can be a state where the serving gNB operates at its maximum capability, e.g., no dormancy or maximum number of active antenna elements, or a minimum state where the serving gNB operates at its minimum capability, e.g., maximum dormancy or minimum number of active antenna elements.

At 1420, the UE receives an indication from the serving gNB for one or more indexes from the set of signaled cell DTX/DRX configurations via L1, MAC CE, or RRC signaling, that include timer values. The timer-based cell DTX/DRX deactivation can be combined with either Type 1 or Type 2 indication of cell DTX/DRX configuration. In case of Type 1 indication for cell DTX/DRX configuration, the UE is provided the timer values during cell DTX/DRX configurations and activation mechanism via higher layer signaling. The higher layer signaling may also indicate to the UE a next cell DTX/DRX configuration index for the UE to assume upon expiration of the timer for a current cell DTX/DRX configuration. In case of Type 2 indication of cell DTX/DRX configuration, the UE may be provided the timer values together with the cell DTX/DRX configurations using higher layer signaling and/or activation DCI/MAC-CE together with a cell DTX/DRX configuration index for the UE to assume upon expiration of the timer for a current cell DTX/DRX configuration. If both the higher layer signaling for cell DTX/DRX configurations and the activation DCI/MAC-CE for a cell DTX/DRX configuration include a timer value, the latter timer value overrides the former timer value. If the UE receives an activation of a cell DTX/DRX configuration index that is same as a current cell DTX/DRX configuration index, the UE resets the timer value (to the initial value).

At 1430, The UE starts a timer for an indicated value of a cell DTX/DRX configuration index and operates according to the indicated cell DTX/DRX parameters. In one embodiment, the timer values can be jointly set for a pair of cell DTX and DRX configurations or, in embodiments, the timer values can be separately set for a cell DTX configuration and a cell DRX configuration. In one embodiment, there is one timer value associated with either a cell DTX configuration, a cell DRX configuration, or a pair of cell DTX/DRX configurations. The timer starts from when a current cell DTX/DRX configuration is activated and runs continuously for the indicated fixed duration of the timer value that can be in milliseconds or in slots for a reference SCS such as the SCS of an active DL BWP for the serving cell or for 15 kHz. In another embodiment, there is a first timer value and a second timer value associated with a cell DTX configuration, a cell DRX configuration, or a pair of cell DTX/DRX configurations. The first timer starts when a current configuration is activated and runs continuously unless the UE receives signaling during cell DTX on-duration, e.g., PDCCH providing DCI indicating PDSCH reception, or transmits signaling during a cell DRX on-duration, e.g., PDCCH providing DCI indicating PUSCH transmission, or receives signaling or transmits signaling for joint cell DTX/DRX on-duration. For cell DTX, if the UE receives signaling during on-duration, the UE starts the second timer. The UE resets the second timer to the initial value every time the UE receives a signaling. For cell DRX and paired cell DTX/DRX, the first and the second timer operation can be similarly understood as described for cell DTX.

At 1440, the UE operates according to a normal mode (non-cell DTX/DRX) or according to a default cell DTX/DRX configuration upon expiration of the timer.

In further embodiments of this disclosure, a UE can be provided from a serving gNB by higher layer signaling, separately or jointly, a set of cell DTX configurations and a set of DRX configurations. The UE is provided by higher layer for the serving cell, or for a cell group, a set of at most N1 (an integer value) cell DTX configurations for DL receptions and a set of at most N2 cell DRX configurations for UL transmissions. N1 and N2 can be same or different integer values. When the sets of cell DTX configurations and cell DRX configurations are jointly provided, the UE is provided by higher layers for the serving cell, or for the cell group, a set of at most N3 cell DTX/DRX configurations. Each of the cell DTX, cell DRX, or joint cell DTX/DRX configurations is assigned an index. When the serving cell is paired with SUL, a set of cell DRX configurations for the serving cell and a set of cell DRX configurations for the paired SUL can be common or separately provided.

If a cell DTX configuration and a cell DRX configuration are separately signaled, a cell DTX configuration from a set of DTX configurations can be linked with a cell DRX configuration from a set of cell DRX configurations. For example, the $i^{th}$ cell DTX configuration and $j^{th}$ cell DRX configuration can be linked, i.e., (i, j), and the UE can then be provided a set of at most N4 pairs of cell DTX and cell DRX configurations. Each of the pairs of cell DTX and cell DRX configurations is assigned an index. For activation of a cell DTX/DRX configuration, the UE is provided an index of the pair of the joint cell DTX and DRX configuration. When the serving cell is paired with SUL, the cell DRX configuration in a pair of cell DTX and cell DRX configuration applies to both the serving cell and the paired SUL. In embodiments, the grouping of configurations can be 3-tuple: one cell DTX configuration for the serving cell, one cell DRX configuration for the serving cell, and another cell DRX configuration for the SUL.

If at least part of the parameters for cell DTX configurations and cell DRX configurations are separately signaled to the UE, the UE can determine time durations in a cell DTX/DRX cycle as at least one from 1) within on-duration for DTX and outside on-duration for DRX, 2) within on-duration for DRX and outside on-duration for DTX, 3) within on-duration for DTX and within on-duration for DRX, 4) outside on-duration for DRX and outside on-duration for DTX. For example, a duration for the period of the DTX cycle can be same as the duration for the period of the DRX cycle, and other parameters on the offset value(s) and on-duration timer can be separately configured for the DTX cycle and DRX cycle. For one further sub-example, the on-duration for the DRX cycle and the on-duration for the DTX cycle may not overlap. For another further sub-example, the on-duration for the DRX cycle and the on-duration for the DTX cycle can be determined separately.

For each cell DTX, cell DRX, or joint cell DTX/DRX configuration, the UE is provided the at least one of following parameters per serving cell, or per cell group, where some of the parameters may be included only in the cell DTX configuration, or only in the cell DRX configuration, or only in the joint cell DTX/DRX configuration: a serving cell or cell group ID, an indicator of either 1) only cell DRX, 2) only cell DTX, or 3) both cell DTX/DRX is configured, cell DTX configuration, cell DRX configuration, UE DRX alignment configuration, spatial and power domain adaptation parameters, and activation configuration.

Cell DTX configuration may be: a duration for the period of the DTX cycle; at least one from {cycleStartOffset, slotOffset, onDurationTimer, inactivityTimer}, there can be two sets of parameters, a first for long cycle and a second for short cycle—the short cell DTX cycle is triggered when the UE receives signaling, e.g., PDCCH providing DCI indicating PDSCH reception, during a long cell DTX on-duration; indications for whether or not at least one of SSB, SI (e.g., SIB1 or SIBx where x>1), msg2/msg4/msgB, paging (e.g., short paging message in PDCCH and/or paging message in PDSCH), DL RS, or PDCCH providing DCI with CRC that is not scrambled by C-RNTI/CS-RNTI/MCS-C-RNTI is present only in the DTX on-duration; if indicated 'not', the at least one of the signals/channels can be transmitted outside of the on-duration and the UE can expect to receive those signals/channels accordingly. In one instance, the indication can be for whether or not at least one of SSB, SI (e.g., SIB1 or SIBx where x>1), msg2/msg4/msgB, paging (e.g., short paging message in PDCCH and/or paging message in PDSCH), DL RS, or PDCCH providing DCI with CRC that is not scrambled by C-RNTI/CS-RNTI/MCS-C-RNTI can be present outside the DTX on-duration.

Cell DRX configuration may be a duration for the period of the DRX cycle. Cell DRX configuration may be an indication on whether or not at least one from {cycleStartOffset, slotOffset, onDurationTimer, inactivityTimer} configured for cell DTX operation also applies to cell DRX operation; if not, a separate set of parameters or a subset of the parameters are provided for cell DRX operation. Similar to cell DTX operation, there can be two sets of parameters, a first for long cycle and a second for short cycle. The short cell DRX cycle is triggered when the UE is indicated to transmit signaling, e.g., UE receives PDCCH providing DCI indicating PUSCH transmission, during long cell DRX on-duration. Cell DRX configuration may also be an indication on whether or not at least one of PRACH/msg3/msgA, SRS, CG-PUSCH, or PUCCH providing SR (e.g., positive SR) can be transmitted outside of the on-duration. When the serving cell is paired with SUL, the cell DRX configuration may be common, partly common, or separate between the serving cell and the paired SUL. As an example, when the cell DRX configuration is partly common between the serving cell and the paired SUL, some of the above listed parameters are separately provided, e.g., on duration, for the serving cell and the paired SUL while the rest of the parameters are common.

UE DRX alignment configuration may be an indication on whether UE DRX is applied during cell DTX/DRX on-duration or whether the UE remains active during cell DTX/DRX on-duration and/or whether UE DRX follows a cell DTX/DRX dormancy pattern that overrides UE DRX. When the UE is indicated to apply UE DRX, the UE can also be indicated whether to adjust UE DRX timers (e.g., at least one of inactivityTimer, HARQ-RTT-Timer, retransmission-Timer, or shortCycleTimer) to align with the cell DTX/DRX pattern, or whether the UE applies the UE DRX timers once triggered during a cell DTX/DRX on-duration.

Spatial and power domain adaptation parameters may be power offset values between PDSCH and CSI-RS indicated by a higher layer. The indication can be by a value of parameter powerControlOffset, or an adjustment value can be indicated to apply to the powerControlOffset value provided by RRC in dB, or an index to a predefined table of values can be provided. The number of active DL antenna ports can be indicated as a part of higher layer signaling.

Activation configuration may be Type 1 and/or Type 2 activation method or joint or separate cell DTX and DRX activation/deactivation. If joint cell DTX and DRX activation/deactivation is configured, a set of pairs of cell DTX and cell DRX configuration indices, including indices for SUL, if the serving cell is paired with SUL, is indicated for activation/deactivation.

In Type 2 cell DTX/DRX activation/deactivation, a UE receives an indication from a serving gNB for one or more indexes from a set of cell DTX/DRX configurations using L1/L2 signaling, e.g., UE-specific, or cell-specific, or UE-group-specific DCI or MAC-CE.

Figure 15:
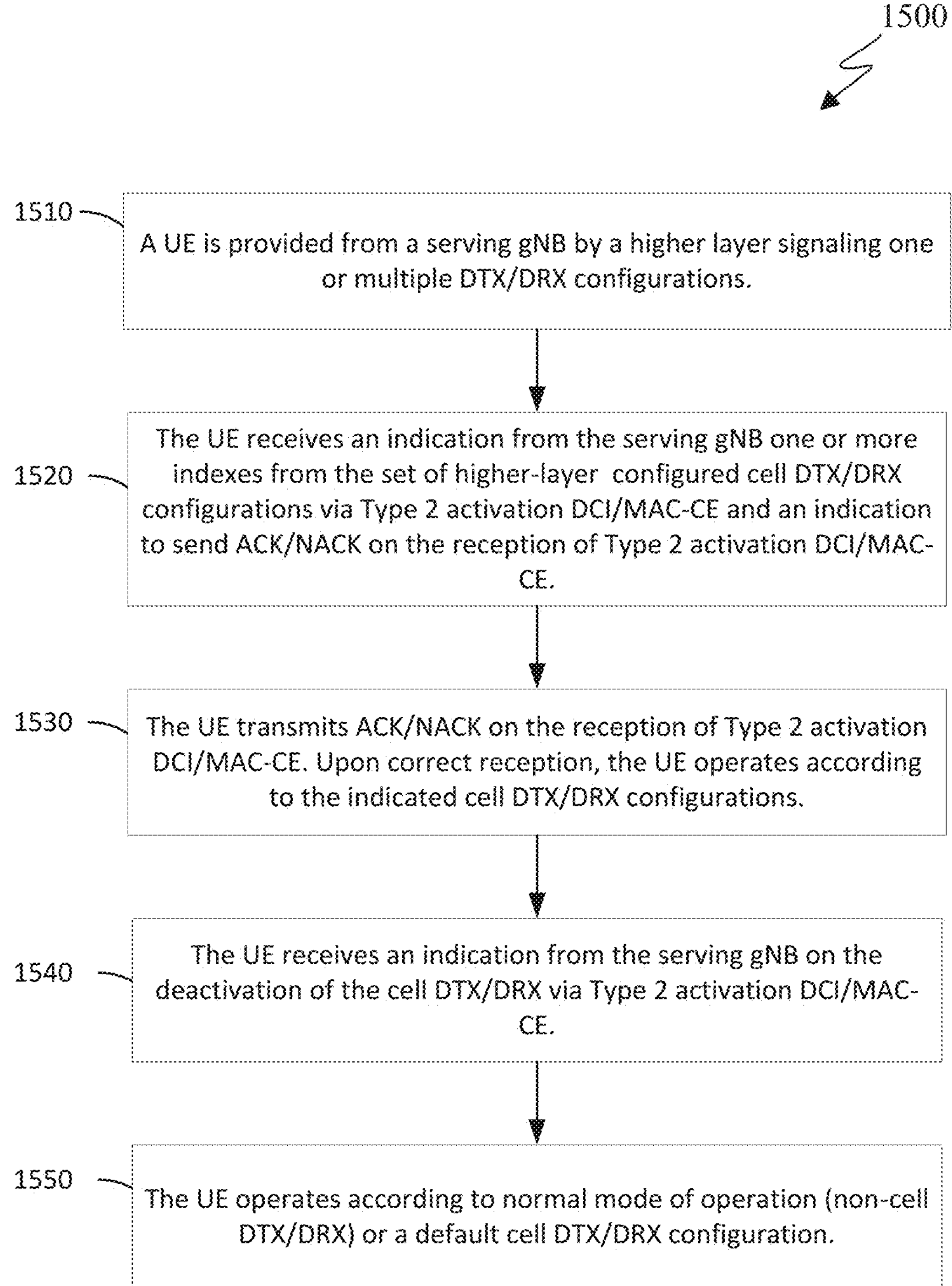
FIG. 15 illustrates a flowchart for a UE to perform Type-2 cell DTX/DRX activation according to embodiments of the present disclosure.

FIG. 15 illustrates a flowchart of a method 1500 for a UE to perform Type-2 cell DTX/DRX activation or deactivation according to embodiment of this disclosure. The embodiment of the method 15 is for illustration only. FIG. 15 does not limit the scope of this disclosure to any particular implementation of the method 1500. One or more steps of the method 1500 may be implemented via one or more gNBs (e.g., gNB 101, gNB 102) and one or more UEs (e.g., UE 114, UE 115), as instructions, stored a memory (e.g., memory 230 or memory 360) and executed by one or more processors (e.g., processor 225 or processor 340).

At 1510, a UE (e.g., 114) is provided from a serving gNB (e.g., gNB 102) by a higher layer signaling one or multiple DTX/DRX configurations. At 1520, the UE receives an indication from the serving gNB one or more indexes from the set of higher-layer configured cell DTX/DRX configurations via Type 2 activation DCI/MAC-CE and an indication to send an acknowledgment or negative acknowledgement (ACK/NACK) on the reception of Type 2 activation DCI/MAC-CE. At 1530, the UE transmits ACK/NACK on the reception of Type 2 activation DCI/MAC-CE. Upon correct reception, the UE operates according to the indicated cell DTX/DRX configurations. At 1540, the UE receives an indication from the serving gNB on the deactivation of the cell DTX/DRX via Type 2 activation DCI/MAC-CE. At 1550, the UE operates according to normal mode of operation (non-cell DTX/DRX) or a default cell DTX/DRX configuration.

In further detail, at 1510, a UE is provided from a serving gNB by higher layers one or more cell DTX/DRX configurations. The UE receives an indication from the serving gNB for one or more indexes for activation of DTX/DRX configurations, from the set of cell DTX/DRX configurations, via DCI/MAC-CE. At 1520, the UE can also receive an indication to provide acknowledgement information for the reception of the DCI/MAC-CE. The UE transmits a PUCCH with the acknowledgement information for the reception of the DCI/MAC-CE activating the DTX/DRX configurations if the UE is indicated to provide acknowledgement information. At 1530, upon correct reception of the DCI/MAC-CE, the UE operates according to the indicated cell DTX/DRX configurations. The acknowledgement information can serve for the serving gNB to ensure that all UEs associated with the serving gNB correctly received the cell DTX/DRX activation/deactivation message. The UE can be further indicated by the serving gNB to provide the acknowledgement information when the UE fails to correctly receive the cell DTX/DRX activation DCI/MAC-CE, i.e., the UE transmits a PUCCH only to provide a negative acknowledgement (NACK). The UE can transmit the PUCCH when, at predetermined occasions, the UE does not correctly receive the DTX/DRX activation DCI/MAC-CE. At 1440, once the UE receives an indication from the serving gNB for the deactivation of the cell DTX/DRX configuration via DCI/MAC-CE, or once the timer associated with the current cell DTX/DRX configuration expires, the UE, at 1550, operates according to a default DTX/DRX configuration (non-cell DTX/DRX) that can be predetermined in the specifications of the system operation or indicated by higher layers.

For cell DTX/DRX activation/deactivation using MAC-CE, the UE receives a PDSCH that provides a MAC-CE indicating one or more indexes of cell DTX/DRX configurations. A DCI scheduling the PDSCH can have CRC that is not scrambled by a C-RNTI/CS-RNTI/C-MCS-RNTI.

Figures 16, 17:
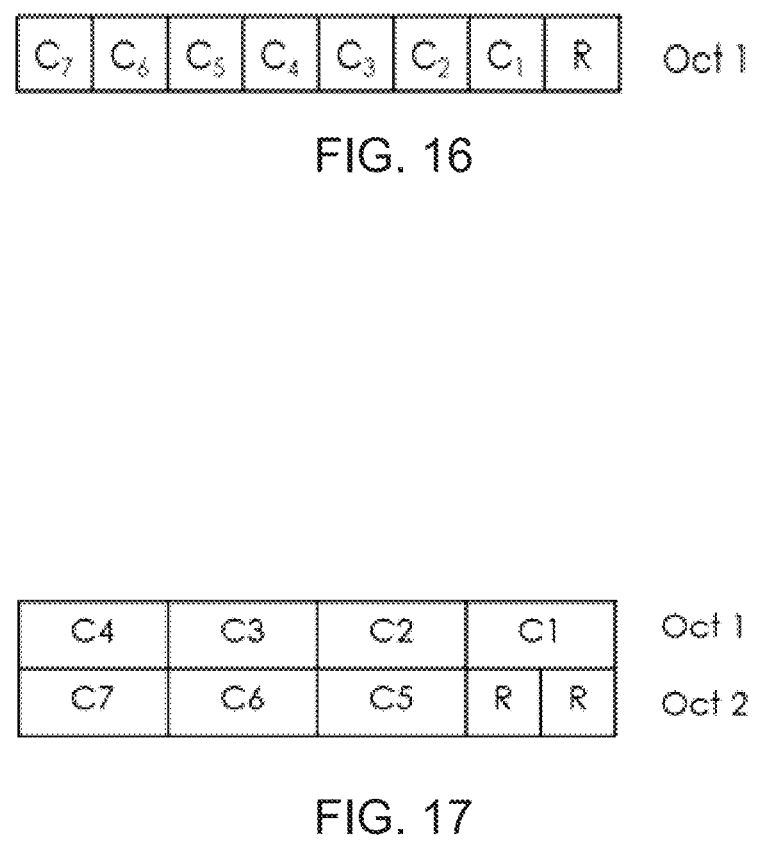

FIG. 16 illustrates a diagram 1600 of an example of MAC-CE for Type 2 cell DTX/DRX. The embodiment of the diagram 1600 is for illustration only. FIG. 16 does not limit the scope of this disclosure to any particular implementation of the diagram 1600.

FIG. 16 illustrates an example MAC-CE with one octet for activation of a cell DTX/DRX configuration, when there is only one cell DTX/DRX configuration per serving cell or cell group, for up to seven serving cells or cell groups. In another example, a MAC CE indicating a cell DTX/DRX configuration can include more than one octet. The MAC CE of one octet for activation of a cell DTX/DRX configured, as illustrated in FIG. 16 for example, is identified by a MAC subheader with an associated LCID. The MAC CE has a fixed size and consists of a single octet containing seven C-fields and one R-field. that are defined as follows:

A C-field (Ci) indicates the activation/deactivation status for a serving cell, or cell group, with index i when there is only one cell DTX/DRX configuration per serving cell, or a cell group. The Ci field is set to 1 to indicate that the cell DTX/DRX parameters configured for serving cell, or cell group, with index i shall be activated. If the field is set to 0, it indicates that the cell DTX/DRX configuration for the corresponding serving cell or cell group shall be deactivated and the UE shall operate according to a normal mode (i.e., non-DTX/DRX) or according to a default cell DTX/DRX configuration that can be indicated by higher layers. The indication can be separately provided for cell DTX and cell DRX, or jointly provided.

An R-field is a reserved bit, set to 0.

FIG. 17 illustrates a diagram 1700 of another example of MAC-CE for Type 2 cell DTX/DRX. The embodiment of the diagram 1700 is for illustration only. FIG. 17 does not limit the scope of this disclosure to any particular implementation of the diagram 1700.

FIG. 17 illustrates an example MAC-CE with two octets for activation of cell DTX/DRX configurations, when there are multiple cell DTX/DRX configurations per serving cell or cell group, such that the MAC-CE indicates activation or deactivation of a cell DTX/DRX configuration with a corresponding index. In this example, there are seven Ci fields for indication of activation/deactivation of a cell DTX/DRX configuration per serving cell or cell group, for up to seven serving cells or cell groups. The Ci field indicates a configuration index using ceil(log 2(N+1))=2 bits, where N is the number of cell DTX/DRX configurations that, in the example of FIG. 16, is three. One codepoint, e.g., 0, corresponds to deactivation of the currently activated cell DTX/DRX configuration. R is a reserved bit. The example MAC CE with two octets for indication of activation/deactivation of a cell DTX/DRX configuration can be identified by a MAC subheader with an associated LCID. In general, a MAC CE for indication of cell DTX/DRX configurations can include a number of octets as required for providing indication for activation/deactivation of cell DTX/DRX configurations for a number of serving cells or cell groups.

In FIG. 16 and FIG. 17, it is exemplified that the activation/deactivation of cell DTX and cell DRX are jointly performed, e.g., by indicating an index of a pair of cell DTX and cell DRX configurations. When the serving cell is paired with SUL, the joint activation/deactivation also applies to the paired SUL. In another example, the MAC-CE can include separate Ci fields for cell DTX, and cell DRX for the serving cell. When the serving cell is paired with SUL, the cell DRX indication also applies to the SUL. In the example of FIG. 16, each Ci field indicates activation/deactivation of higher-layer provided cell DTX and cell DRX configurations. In the case of FIG. 16 example, each Ci field indicates an index from the set of higher-layer provided cell DTX and cell DRX configurations for the activation and a reserved codepoint, e.g., 0, for the deactivation of the currently activated configuration.

For indication of activation/deactivation of a cell DTX/DRX configuration using DCI, the UE receives a PDCCH that provides a DCI indicating one or more indexes for cell DTX/DRX configurations. Similar to the MAC-CE design, the DCI includes M fields, where M is the number of serving cells or cell groups indicated by higher layers, and each field includes ceil(log 2(N+1)) bits, where N is the number of cell DTX/DRX configurations per serving cell or cell group. Each field i, for the ith serving cell or cell group, indicates an index of the cell DTX/DRX configurations for activation from the set of N configurations. One codepoint, e.g., 0, corresponds to deactivation of the cell DTX/DRX. If only one cell DTX/DRX configuration is provided for a serving cell or cell group, each field i is a one-bit indication for the activation/deactivation status of cell DTX/DRX for a corresponding serving cell or cell group with index i. In the above example, the activation/deactivation of cell DTX and cell DRX are jointly performed, e.g., by indicating an index of a pair of cell DTX and cell DRX configurations. When the serving cell is paired with SUL, the joint activation/deactivation also applies to the paired SUL. In another example, the DCI can separate indicate activation (with corresponding configuration ID if more than one configurations are provided)/deactivation for cell DTX, and cell DRX for the serving cell. When the serving cell is paired with SUL, the cell DRX indication also applies to the SUL.

The PDCCH providing a DCI for activation of cell DTX/DRX configuration can be UE-specific (e.g., CRC scrambled by a C-RNTI) or cell-specific or UE-group-specific (e.g., CRC scrambled by a new RNTI). A UE-specific DCI can include cell DTX/DRX parameters in addition to the indications for activation/deactivation and/or cell DTX/DRX configuration index. For cell-specific or UE-group-specific DCI, a new RNTI that can be defined for cell DTX/DRX activation/deactivation and can be referred to as NES-RNTI, for brevity. In one embodiment, the cell-specific or UE-group-specific DCI can indicate an index of the cell DTX/DRX configuration for the serving cell or cell group. One codepoint, e.g., 0, corresponds to deactivation of the currently activated cell DTX/DRX configuration. In another embodiment, a UE-group-specific DCI can include K blocks of information for a group of K UEs, where each UE is provided a starting position for its own block via higher layer signaling. The information provided in each block for each UE can be similar to or a subset of the information provided by the UE-specific DCI.

In another embodiment, a DCI/MAC CE indicates to a UE a series of L indices of cell DTX/DRX configurations per serving cell or cell group for the UE to switch among a series of cell DTX/DRX configurations. A series of L indices of cell DTX/DRX configurations is indicated by L*ceil(log 2(N+1)) bits, where N is the number of cell DTX/DRX configurations indicated by higher layers for a given serving cell or cell group. There can be one or more timer values associated with each cell DTX/DRX configuration, as provided by higher layers or by DCI/MAC-CE, and the UE switches among a series of cell DTX/DRX configurations upon expiration of the timers for each indicated cell DTX/DRX configuration. At the end of the series of cell DTX/DRX configuration switching, the UE may remain in the last state unless indicated another cell DTX/DRX configuration by DCI/MAC-CE or, in embodiments, the UE switches to normal mode of operation (non-cell DTX/DRX) or a default cell DTX/DRX configuration that can be defined in the specifications of the system operation or provided by higher layers.

In yet another embodiment, an index of cell DTX/DRX configuration and a next PDCCH monitoring occasion for a DCI/MAC-CE activating a cell DTX/DRX configuration are indicated by the DCI/MAC-CE per serving cell or a cell group. The next PDCCH monitoring occasion can be indicated by a pair of values for start timing and duration. The start timing can be indicated by a timer from a time when the UE receives the PDCCH or PDSCH providing the DCI/MAC-CE that indicates the timer. In this case, a number of T timer values can be predefined or indicated by higher layers using ceil(log 2(T)) bits in the DCI/MAC-CE. In embodiments, the start timing can be indicated by the subframe/slot/symbol indices associated with a corresponding PDCCH monitoring occasions. The monitoring duration can be indicated from another set of values predefined or configured.

When the UE is configured with more than one serving cells, the DCI/MAC-CE indication for activation/deactivation of cell DTX/DRX can be separately provided to UE per serving cell or cell group. In embodiments, one DCI/MAC-CE indication can provide activation/deactivation, along with corresponding cell DTX/DRX configuration ID(s) if more than one configurations are provided via higher layer signaling, for multiple serving cells or cell groups.

The cell DTX/DRX activation/deactivation DCI can be also used to indicate to extend the current cell DTX/DRX on-duration or entirely skip the next cell DTX/DRX off-duration for the currently activated cell DTX/DRX configuration. Similarly, the cell DTX/DRX activation/deactivation DCI can be used to indicate to extend the following cell DTX/DRX off-duration or entirely skip the next cell DTX/DRX on-duration. For indicating skipping of next cell DTX/DRX on-duration or off-duration, one-bit indication can be provided in the DCI per cell DTX/DRX pair or per cell DTX and cell DRX separately. If the serving cell is paired with SUL, a separate one-bit indication can be provided for the SUL or an indication provided for the serving cell also applies to the SUL. When the UE is configured with more than one serving cells, the DCI indication for indicating skipping of next cell DTX/DRX on-duration or off-duration can be separately provided to UE per serving cell or cell group. In embodiments, one DCI can provide indications for multiple serving cells or cell groups, where the DCI includes multiple one-bit indications, one for each serving cell or cell group. The DCI can also indicate extending the current cell DTX/DRX on-duration or the following cell DTX/DRX off-duration. The extension can be indicated in millisecond, in symbols, in slots, or via an index from a set of predefined values. Similarly, as for skip indication, the extension can be indicated per cell DTX/DRX pair or per cell DTX and cell DRX separately. Also, the DCI can be separately provided to UE per serving cell or cell group or jointly provided for multiple serving cells or cell groups.

A serving cell can configure a UE to perform neighboring cell measurement and reporting per measurement configuration including intra/inter-RAT and intra/inter-frequencies. A UE can be configured to use SSB or CSI-RS for the measurement. When CSI-RS is used for neighboring cell measurement, the referenceSignalConfig in the MeasObject points to a CSI-RS resource configuration with a corresponding cell ID, measurement bandwidth, and slot configuration for the measurement. When SSB is used for neighboring cell measurement, SSB configuration pointed by referenceSignalConfig and SMTC (SSB measurement timing configuration) are provided to UE.

In one embodiment, the cell DTX/DRX configuration information is shared among neighboring gNBs via Xn or NG interfaces. The serving cell provides the received neighboring cell DTX configuration information to UEs, e.g., in the MeasObject configuration, and the UE skips measuring SSB or CSI-RS, if it falls in a cell DTX off-duration. When a neighboring cell supports multiple cell DTX/DRX configurations and dynamic activation among the multiple configurations, the serving cell can provide multiple of such neighboring cell's DTX configurations to UE. Alternatively, the neighboring cell's multiple cell DTX configurations can be consolidated into single configuration by taking intersection of on-durations from multiple configurations and a single configuration is provided to UE per neighboring cell. Further alternatively, the serving cell can consider neighboring cell's cell DTX into slot configuration or SMTC configuration for CSI-RS and SSB measurements such that the measurement occasions fall into the neighboring cell's on-duration.

Similarly, when a serving cell provides handover command to a UE, the serving cell can also provide neighboring cell's cell DRX information and whether RACH occasions are affected by cell DRX off-duration or not. If neighboring cell's RACH occasion is affected by cell DRX, the UE shall perform random access only during the indicated neighboring cell's DRX on-duration. Similar to the cell DTX, if the neighboring cell supports multiple cell DTX/DRX configurations and dynamic activation among the multiple configurations, the serving cell can provide multiple of such neighboring cell's DRX configurations to UE or, alternatively, multiple cell DRX configurations can be consolidated into single configuration by taking intersection of on-durations and a resulting single configuration is provided to UE per neighboring cell.

In one example, the cell DTX/DRX configuration information shared among neighboring gNBs via Xn or NG interfaces may not be the same with configurations that the neighboring gNB provides to served UEs. When DCI-based extension or skipping of cell DTX/DRX on/off-durations are considered, the neighboring cell can determine a guaranteed cell DTX/DRX on-duration unaffected by extension or skipping and such guaranteed on-duration can be shared among neighboring gNBs via Xn or NG interfaces.

Any of the above variation embodiments can be utilized independently or in combination with at least one other variation embodiment. The above flowchart illustrates example methods that can be implemented in accordance with the principles of the present disclosure and various changes could be made to the methods illustrated in the flowchart herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method performed by a user equipment (UE), the method comprising:

receiving:

a radio resource control (RRC) message including first information configuring a set of parameters associated with cell discontinuous transmission (DTX) or cell discontinuous reception (DRX) on a cell, and an indication for activation or deactivation of the cell DTX or the cell DRX for the cell, wherein the indication is provided by:

a downlink control information (DCI) format including one or more information blocks in a physical downlink control channel (PDCCH); or the RRC message;

determining one of:

an active period and a non-active period of the cell DTX based on the indication for activation or deactivation of the cell DTX, or an active period and a non-active period of the cell DRX based on the indication for activation or deactivation of the cell DRX; and performing one of:

receiving channels or signals on the cell based on the active period and the non-active period of the cell DTX, or transmitting channels or signals on the cell based on the active period and the non-active period of the cell DRX, wherein the indication for activation or deactivation of the cell DRX applies to both an uplink (UL) carrier and a secondary UL (SUL) carrier when the cell includes the SUL carrier.

2. The method of claim 1, wherein whether the set of parameters are for the cell DTX only, the cell DRX only, or both the cell DTX and cell DRX is identified based on the first information.

3. The method of claim 1, wherein the RRC message includes the indication indicating activation of the cell DTX or the cell DRX according to the set of parameters.

4. The method of claim 1, wherein:

the indication is provided by the DCI format, a cyclic redundancy check (CRC) of the DCI format is scrambled by a radio network temporary identifier (RNTI) associated with the cell DTX and the cell DRX, and the RRC message further includes second information providing a starting bit position of an information block of the DCI format for the UE for the cell.

5. The method of claim 1, wherein, when the indication is provided by the DCI format:

a '0' value for a bit of a cell DTX or cell DRX indication field in an information block of the DCI format indicates deactivation of the cell DTX or the cell DRX, and a '1' value for the bit of the cell DTX or cell DRX indication field in an information block of the DCI format indicates activation of the cell DTX or the cell DRX.

6. The method of claim 1, wherein:

the indication is provided by the DCI format, and the DCI format provides:

an indication to extend a current active period or non-active period of the cell DTX or the cell DRX, or an indication to skip the current active period or non-active period of the cell DTX or the cell DRX.

7. A base station (BS) comprising:

a transceiver configured to transmit:

a radio resource control (RRC) message including first information configuring a set of parameters associated with cell discontinuous transmission (DTX) or cell discontinuous reception (DRX) on a cell, and an indication for activation or deactivation of the cell DTX or the cell DRX for the cell, wherein the indication is provided by:

a downlink control information (DCI) format including one or more information blocks in a physical downlink control channel (PDCCH); or the RRC message; and a processor operably coupled to the transceiver, the processor configured to determine one of:

an active period and a non-active period of the cell DTX based on the indication for activation or deactivation of the cell DTX, or an active period and a non-active period of the cell DRX based on the indication for activation or deactivation of the cell DRX, wherein the transceiver is further configured to perform one of:

transmit channels or signals on the cell based on the active period and the non-active period of the cell DTX, or receive channels or signals on the cell based on the active period and the non-active period of the cell DRX, wherein the indication for activation or deactivation of the cell DRX applies to both an uplink (UL) carrier and a secondary UL (SUL) carrier when the cell includes the SUL carrier.

8. The BS of claim 7, wherein whether the set of parameters are for the cell DTX only, the cell DRX only, or both the cell DTX and cell DRX is identified based on the first information.

9. The BS of claim 7, wherein the RRC message includes the indication indicating activation of the cell DTX or the cell DRX according to the set of parameters.

10. The BS of claim 7, wherein:

the indication is provided by the DCI format, a cyclic redundancy check (CRC) of the DCI format is scrambled by a radio network temporary identifier (RNTI) associated with the cell DTX and the cell DRX, and the RRC message further includes second information providing a starting bit position of an information block of the DCI format for a UE for the cell.

11. The BS of claim 7, wherein, when the indication is provided by the DCI format:

a '0' value for a bit of a cell DTX or cell DRX indication field in an information block of the DCI format indicates deactivation of the cell DTX or the cell DRX, and a '15' value for the bit of the cell DTX or cell DRX indication field in an information block of the DCI format indicates activation of the cell DTX or the cell DRX.

12. The BS of claim 7, wherein:

the indication is provided by the DCI format, and the DCI format provides:

an indication to extend a current active period or non-active period of the cell DTX or the cell DRX, or an indication to skip the current active period or non-active period of the cell DTX or the cell DRX.

13. A user equipment (UE) comprising:

a transceiver configured to receive:

a radio resource control (RRC) message including first information configuring a set of parameters associated with cell discontinuous transmission (DTX) or cell discontinuous reception (DRX) on a cell, and 'an indication for activation or deactivation of the cell DTX or the cell DRX for the cell, wherein the indication is provided by:

a downlink control information (DCI) format including one or more information blocks in a physical downlink control channel (PDCCH); or the RRC message; and a processor operably coupled to the transceiver, the processor configured to determine one of:

an active period and a non-active period of the cell DTX based on the indication for activation or deactivation of the cell DTX, or an active period and a non-active period of the cell DRX based on the indication for activation or deactivation of the cell DRX, wherein the transceiver is further configured to one of:

receive channels or signals on the cell based on the active period and the non-active period of the cell DTX, or transmit channels or signals on the cell based on the active period and the non-active period of the cell DRX, wherein the indication for activation or deactivation of the cell DRX applies to both an uplink (UL) carrier and a secondary UL (SUL) carrier when the cell includes the SUL carrier.

14. The UE of claim 13, wherein whether the set of parameters are for the cell DTX only, the cell DRX only, or both the cell DTX and DRX is identified based on the first information.

15. The UE of claim 13, wherein the RRC message includes the indication indicating activation of the cell DTX or the cell DRX according to the set of parameters.

16. The UE of claim 13, wherein:

the indication is provided by the DCI format, a cyclic redundancy check (CRC) of the DCI format is scrambled by a radio network temporary identifier (RNTI) associated with the cell DRX, and the RRC message further includes second information providing a starting bit position of an information block of the DCI format for the UE for the cell.

17. The UE of claim 13, wherein, when the indication is provided by the DCI format:

a '0' value for a bit of a cell DTX or cell DRX indication field in an information block of the DCI format indicates deactivation of the cell DTX or the cell DRX, and a '15' value for the bit of the cell DTX or cell DRX indication field in an information block of the DCI format indicates activation of the cell DTX or the cell DRX.

* * * * *